United States Patent
Kim et al.

(10) Patent No.: US 9,302,188 B2
(45) Date of Patent: Apr. 5, 2016

(54) APPARATUS, METHOD AND COMPUTER READABLE RECORDING MEDIUM FOR INTERWORKING ACCOUNT BASED ON MOBILE TERMINAL AND ACCOUNT BASED ON GAME

(71) Applicant: NHN Corporation, Seongnam-si (KR)

(72) Inventors: Hyun Jung Kim, Seongnam-si (KR);
Seong Youn Joo, Seongnam-si (KR);
Jong Yoon Kim, Seongnam-si (KR);
Hye Kyung Park, Seongnam-si (KR);
Yu Ik Yim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 130 days.

(21) Appl. No.: 13/936,505

(22) Filed: Jul. 8, 2013

(65) Prior Publication Data
US 2014/0011592 A1    Jan. 9, 2014

(30) Foreign Application Priority Data

Jul. 6, 2012 (KR) .................. 10-2012-0073984

(51) Int. Cl.
| | | |
|---|---|---|
| *A63F 13/12* | (2006.01) | |
| *A63F 13/79* | (2014.01) | |
| *A63F 13/30* | (2014.01) | |
| *A63F 13/70* | (2014.01) | |
| *A63F 13/335* | (2014.01) | |

(52) U.S. Cl.
CPC .............. *A63F 13/79* (2014.09); *A63F 13/12* (2013.01); *A63F 13/30* (2014.09); *A63F 13/335* (2014.09); *A63F 13/70* (2014.09); *A63F 2300/532* (2013.01); *A63F 2300/5546* (2013.01)

(58) Field of Classification Search
CPC ....... A63F 13/12; A63F 13/30; A63F 13/335; A63F 13/35; A63F 13/70; A63F 13/79; A63F 2300/5546; A63F 2300/554; A63F 2300/403
See application file for complete search history.

(56) References Cited

U.S. PATENT DOCUMENTS

| | | | |
|---|---|---|---|
| 2002/0087892 A1* | 7/2002 | Imazu | .......................... 713/202 |
| 2002/0160838 A1* | 10/2002 | Kim | ................................ 463/42 |
| 2003/0186680 A1* | 10/2003 | Bhasin et al. | ................. 455/411 |

(Continued)

FOREIGN PATENT DOCUMENTS

| | | |
|---|---|---|
| JP | 2009-247457 | 10/2009 |
| JP | 2010-009530 | 1/2010 |
| JP | 2010-539765 | 12/2010 |
| JP | 2011-133951 | 7/2011 |
| KR | 10-2011-0068623 | 6/2001 |

(Continued)

*Primary Examiner* — Dmitry Suhol
*Assistant Examiner* — David Duffy
(74) *Attorney, Agent, or Firm* — H.C. Park & Associates, PLC

(57) ABSTRACT

An apparatus for interworking a mobile terminal account and a gaming account by interworking game record information in the mobile terminal and a game integration account used in multiple games. The method includes: storing information, on a storage device, on a game integration ID used to manage games for the gaming account; receiving, from a mobile terminal, unique terminal identification information of the mobile terminal; confirming whether a mobile ID is mapped to the terminal identification information; creating a mobile ID mapped to the terminal identification information when the confirming determines that a mobile ID is not mapped to the terminal identification information; and mapping, one-to-one, the created mobile ID and the game integration ID.

20 Claims, 31 Drawing Sheets

(56) References Cited

U.S. PATENT DOCUMENTS

| | | | |
|---|---|---|---|
| 2006/0050688 A1* | 3/2006 | Panagopoulos et al. | 370/356 |
| 2008/0120561 A1* | 5/2008 | Woods | 715/764 |
| 2008/0146337 A1* | 6/2008 | Halonen et al. | 463/42 |
| 2009/0144237 A1* | 6/2009 | Branam et al. | 707/3 |
| 2009/0280905 A1* | 11/2009 | Weisman et al. | 463/40 |
| 2013/0060869 A1* | 3/2013 | Davis et al. | 709/206 |
| 2013/0290711 A1* | 10/2013 | Rajkumar et al. | 713/168 |

FOREIGN PATENT DOCUMENTS

| | | |
|---|---|---|
| KR | 10-0562147 | 7/2001 |
| KR | 10-0822161 | 4/2008 |
| KR | 10-2009-0015262 | 2/2009 |
| KR | 10-2011-0135754 | 12/2011 |
| WO | 2005/015420 | 2/2005 |
| WO | 2009/033872 | 3/2009 |

* cited by examiner

FIG.3

| terminal identification information | mobile ID | game integration ID |
|---|---|---|
| device A ↔ | mobileID_1 ↔ | hanID_1 |
| device B ↔ | mobileID_2 | |

APPARATUS, METHOD AND COMPUTER READABLE RECORDING MEDIUM FOR INTERWORKING ACCOUNT BASED ON MOBILE TERMINAL AND ACCOUNT BASED ON GAME

CROSS-REFERENCE TO RELATED APPLICATIONS

This application claims priority from and the benefit of Korean Patent Application No. 10-2012-0073984, filed on Jul. 6, 2012, which is hereby incorporated by reference for all purposes as if fully set forth herein.

BACKGROUND

1. Field

Exemplary embodiments of the present invention relate to a method for interworking an account based on a mobile terminal and an account based on a game, and more particularly, to an apparatus, a method, and a computer readable recording medium for interworking an account based on a mobile terminal and an account based on a game capable of providing a service by interworking game record information in the mobile terminal and a game integration account used in a plurality of games.

2. Discussion of the Background

At present, due to wide diffusion of the Internet, rapid development from a wired communication technology to a wireless mobile communication technology has been made, and users have searched information on the Internet through a portable terminal, such as, a cellular phone, a personal digital assistant, a handheld computer, or the like, regardless of a time and a place in real life.

In accordance with improvement of performance of smart phones that have been recently released, many users have replaced general cellular phones with the smart phones. The smart phone, which is an intelligent cellular phone having computer support functions as well as functions of the cellular phone, has a personal digital assistant (PDA) function, an Internet function, a moving picture reproducing function, and the like, added thereto while satisfying cellular phone functions, and includes various input schemes and touch screens to provide an interface that is more convenient for use. As the smart phone supports a wireless Internet function, it also accesses the Internet and a computer to perform functions of a terminal, such as, an E-mail function, a web browsing function, a fax function, a banking function, a game function, and the like. The smart phone also has a standardized operating system (OS) or a dedicated operating system in order to accommodate various functions. As described above, as implementation of various functions is enabled through various user terminals, such as, the smart phone, and the like, various dedicated application programs and contents driven in the user terminals have been developed.

Recently, in accordance with the development of a computer related information and communication technology, game industries have been rapidly developed. Among them, in the case of a single casual game a user may easily play, there is a tendency for the users to play one game for a long time, such that success or failure of a business depends on whether various kinds of games may be provided to the users at a cheap cost. In order to provide various games as described above, a distributor distributing the games generally receives and provides several games from a game manufacturer.

As described above, in the case of games requiring storage of records or having a level rising as the games are played among various on-line games, a log in can be needed to play the corresponding game to maintain the corresponding game. A game portal site (for example, HANGAME, or the like, of NAVER) providing a plurality of games may allow the users to simultaneously log in the plurality of games using a single game integration identification (ID) to promote convenience of the users.

However, in the case of performing the log-in using the integration ID as described above, several problems may occur. Further, in the case of playing the same game by the mobile terminal, a record of the game played in a personal computer (PC) and a record of the game played in the mobile terminal do not effectively interwork, which provides large inconvenience to the users. Log-in in the mobile terminal is managed separately from log-in in the PC, such that linkage for the same game is not provided to the users.

For example, when one of a plurality of games is initialized, as it is managed using the integration ID, a serious problem that all of records for other games are initialized occurs. When logging in and playing a specific game using an ID in the mobile terminal and then playing another game, the case in which the log-in is performed using an ID in the PC occurs, which provides inconvenience for the log-in to the user. Further, in the case of logging in and playing one game and playing another game after logging-out from one game, log-in should be again performed, which is inconvenient.

In the case of logging in and playing the game using the integration ID, when logging out from another game, since log-out from the game that is currently played is performed, a problem that not all of the records for the game that is currently played are stored occurs.

In the case of dropping a game platform to a home button and a game background and then confirming an authentication number character in order to confirm an authentication number during playing a game through the mobile terminal, there is also a problem that a process of again loading the game from the beginning is repeated, such that the authentication number may not be input.

Even though records for a game logged-in and played using the game integration ID by a first mobile terminal are stored, in the case of again starting the corresponding game by a second mobile terminal, the records for the game played by the first mobile terminal may not be fetched or stored, such that the record may not be interworked between terminals.

A method for authenticating a user of an online game capable of solving a problem in authenticating a user and simply performing an accounting confirming process using an authentication certificate in a network system is known.

However, the known method does not provide a method for interworking a game integration ID for a plurality of games and unique information of a mobile terminal.

Therefore, a method of efficiently providing record management and authentication management of a user by interworking a game integration ID providing integration log-in for a plurality of games and authentication in a mobile terminal is desirable.

BRIEF SUMMARY

Aspects of the present invention provide an apparatus, a method, and a computer readable recording medium for interworking an account based on a mobile terminal and an account based on a game capable of interworking and providing a game play record in a personal computer (PC) and a game play record in the mobile terminal by interworking unique identification information on the mobile terminal and a game integration account comprehensively used in a plurality of games.

Aspects of the present invention provide an apparatus, a method, and a computer readable recording medium for interworking an account based on a mobile terminal and an account based on a game capable of storing a game play record of the mobile terminal in a game integration account without performing a separate log-in procedure for a game that does not require authentication by interworking terminal identification information created from device unique information on the mobile terminal to the game integration account.

Aspects of the present invention provide an apparatus, a method, and a computer readable recording medium for interworking an account based on a mobile terminal and an account based on a game capable of processing authentication for individual games and using an integration account for a plurality of game in a single mobile terminal by separating authentication between applications.

Aspects of the present invention provide an apparatus, a method, and a computer readable recording medium for interworking an account based on a mobile terminal and an account based on a game capable of providing an authentication system focused on individual applications in consideration of characteristics of a mobile terminal, such as, a smart phone, or the like, performing access and authentication in a unit of individual games even in the mobile terminal by interworking authentication in the mobile terminal and a game integration account, and managing a game play record for the mobile terminal.

Additional features of the invention will be set forth in the description that follows, and in part will be apparent from the description, or may be learned by practice of the invention.

According to exemplary embodiments of the present invention, there is provided an apparatus including: a game integration identification (ID) information database configured to store information on a game integration ID that manages games on a storage device; a mobile ID confirming unit configured to receive, from the mobile terminal, unique terminal identification information of the mobile terminal and configured to confirm, with a processor, whether a mobile ID is mapped to the terminal identification information; a mobile ID creating unit configured to create a new mobile ID mapped to the terminal identification information when the mobile ID confirming unit confirms that the mobile ID is not mapped to the terminal identification information; and a game ID mapping unit configured to create a one-to-one mapping between the created mobile ID and the game integration ID.

According to exemplary embodiments of the present invention, there is provided a method including: storing information, on a storage device, on a game integration ID used to manage games; receiving, from a mobile terminal, unique terminal identification information of the mobile terminal; confirming whether a mobile ID is mapped to the terminal identification information; creating a mobile ID mapped to the terminal identification information when the confirming determines that a mobile ID is not mapped to the terminal identification information; and mapping, one-to-one, the created mobile ID and the game integration ID.

Information for providing the method for interworking an account based on a mobile terminal and an account based on a game may be stored in a server computer readable recording medium. The recording medium may include all kinds of recording media in which a program and data are stored to be readable by a computer system. The recording medium may include a read only memory (ROM), a random access memory (RAM), a compact disk (CD), a digital video disk (DVD) ROM, a magnetic tape, a floppy disk, an optical data storage, or the like, and a medium implemented in a form of a carrier wave (for example, transmission through the Internet). In addition, the recording medium may be distributed in a computer system connected by a network, such that a computer readable code may be stored and executed in a distributed scheme.

It is to be understood that both the foregoing general description and the following detailed description are exemplary and explanatory and are intended to provide further explanation of the invention as claimed.

BRIEF DESCRIPTION OF THE DRAWINGS

The above and other objects, features and advantages of the present disclosure will become apparent from the following description of certain exemplary embodiments given in conjunction with the accompanying drawings. The accompanying drawings, which are included to provide a further understanding of the invention and are incorporated in and constitute a part of this specification, illustrate embodiments of the invention, and together with the description serve to explain the principles of the invention.

FIG. 3 illustrates a data structure according to exemplary embodiments of the present invention.

DETAILED DESCRIPTION OF THE ILLUSTRATED EMBODIMENTS

Figure 1:
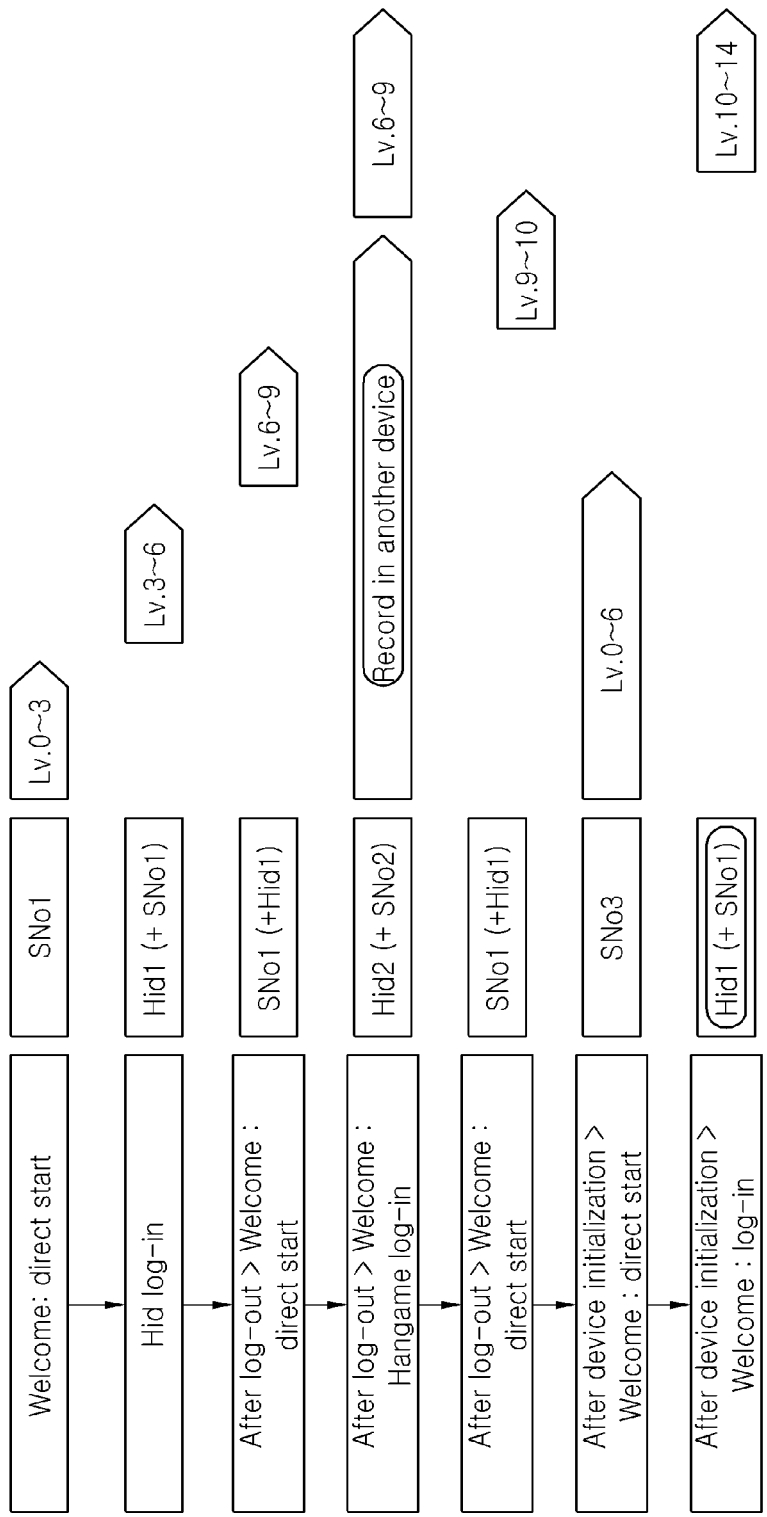
FIG. 1 illustrates an authentication concept according to use of individual games according to exemplary embodiments of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Embodiments described in the specification are wholly hardware, and may be partially software or wholly software. In the specification, "unit", "module", "device", "system", or the like represents a computer related entity, such as, hardware, combination of hardware and software, or software. For example, in the specification, the unit, the module, the device, the system, or the like may be an executed process, a processor, an object, an executable file, a thread of execution, a program, and/or a computer, but are not limited thereto. For example, both of an application which is being executed in the computer and a computer may correspond to the unit, the module, the device, the system, or the like in the specification.

Hereinafter, exemplary embodiments of the present invention will be described in detail with reference to the accompanying drawings.

Exemplary embodiments describe a method for interworking a game play record in a personal computer (PC) and a game play record in a mobile terminal by interworking unique identification information on the mobile terminal and a game integration account comprehensively used in a plurality of games.

A mobile ID is created from the unique identification information (that is, terminal identification information) on the mobile terminal, and is one-to-one mapped to a game integration ID. The mobile ID may be stored. Record information on the played game may be automatically stored in an account of the mapped game integration ID without performing a separate log-in process by a user in a mobile terminal in which the mobile ID and the game integration ID are mapped to each other as described above.

According to exemplary embodiments of the present invention, the user may perform log-in through a game integration ID selected among a plurality of game integration IDs in the mobile terminal, such that he/she may play a specific game in another terminal while having continuity of a record for the specific game. The user performs a log-in using a plurality of game integration IDs in a specific mobile terminal and plays the respective individual games in different accounts, such that record loss due to log-out in any one account may be prevented.

According to exemplary embodiments of the present invention, when the user is to play a game requiring authentication due to rating restriction in the mobile terminal, the log-in is compelled, thereby making it possible to provide a game authentication environment meeting various conditions while promoting convenience of the user through the mobile terminal.

A 'mobile terminal' includes a terminal having portability and mobility, such as, a smart phone, a laptop computer, a digital broadcasting terminal, an MP3 player, a personal digital assistant (PDA), a portable multimedia player (PMP), a navigation device, and the like. Hereinafter, in the following description, the term mobile terminal includes a user terminal for convenience of explanation.

'Terminal identification information' includes unique information through which a specific mobile terminal may be identified. For example, any unique information through which the terminal may be identified, including a terminal serial number, medium access control (MAC) information on a network, ID information of an operating system (for example, ANDROID, IOS, or the like), or the like, may be included in the terminal identification information. However, the present invention is not limited to the above-mentioned information.

A 'mobile ID' includes ID information automatically created for the terminal identification information and is one-to-one mapped and managed to the mobile terminal. When the mobile ID is granted access to a specific mobile terminal, the user may perform automatic authentication and log-in using the granted mobile ID in the corresponding terminal without performing a separate log-in procedure. Therefore, even though the user plays a game that does not require separate authentication without performing the log-in, a play record may be stored by the mobile ID used for automatic log-in.

A 'game integration ID' includes an ID provided by a game portal (for example, HANGAME, or the like) providing a plurality of games through a single web server so that the respective users may simultaneously log in to a plurality of games. The respective users may create and manage a single game integration ID or a plurality of game integration IDs. Therefore, the users creating the plurality of game integration IDs may play games while managing separate records for each game integration ID with respect to the respective games.

According to exemplary embodiments of the present invention, the mobile IDs granted to the respective mobile terminals are one-to-one mapped to and thus managed in an already created game integration ID. Therefore, in the case of playing the game using a specific game integration ID in the mobile terminal without performing a separate log-in procedure, a game play record may be automatically stored in the corresponding game integration ID one-to-one mapped to the mobile ID used for automatic log-in in the mobile terminal.

Hereinafter, exemplary embodiments of the present invention will be described in detail with reference to the accompanying drawings so that those skilled in the art may easily implement the spirit of the present invention.

Concept of Interworking Accounts

FIG. 1 illustrates an authentication concept according to use of individual games according to exemplary embodiments of the present invention. Referring to FIG. 1, in the case of first playing a game in a mobile terminal, the mobile ID is created as described above and interworks and is managed with a game integration ID.

For example, in the case of starting a specific game in a specific mobile terminal, the corresponding game may be directly played while a game start screen (a welcome screen) is displayed. When the mobile ID for the mobile terminal is not created, a new mobile ID is created, and when the mobile ID is already created, automatic log-in is performed using the created mobile ID (for example, SNo1). The mobile ID created in the mobile terminal is continuously used as a unique value for the mobile terminal before device initialization for the mobile terminal is performed. The user performs automatic log-in using 'SNo1', which is the 'created mobile ID', as an account of the mobile terminal to play the game. The case in which a specific game is performed from a level 0 up to a level 3 is shown in FIG. 1.

Then, the user may perform the log-in in the mobile terminal using a specific game integration ID (Hid) that he/she has already subscribed. The case in which the log-in is performed using 'Hid1' is shown as an example in FIG. 1. according to exemplary embodiments of the present invention, 'Hid1', which is the game integration ID used for the log-in is one-to-one mapped to 'SNo1', which is the mobile ID, and the mapped information is transmitted to a game server (or a game system), or the like.

Therefore, after the mapping is performed as described above, when the log-in is not performed using any game integration ID in the mobile terminal having the mobile ID corresponding to "SNo1", a record for games played in the mobile terminal is also stored in 'Hid1'. When the log-in is performed using 'Hid1' in any other terminals including the mobile terminal including the mobile ID corresponding to 'SNo1', a record for the game played by the corresponding mobile terminal is also stored in 'SNo1'.

When the log-in is performed using 'Hid1' as described above, the ID is mapped as described above and information on the record of the game played before the log-in is stored in an account of 'Hid1'. Therefore, after the log-in is performed using 'Hid1', the game may be played from the level 3 by the information on the record of the game played before the log-in.

When the game is played up to a level 6 in a state in which the log-in is performed using 'Hid1' and log-out is then performed, an account of 'Hid1', which is the game integration ID, is logged out. However, as 'SNo1', which is the mobile ID mapped to 'Hid1' is continuously in a state in which it is automatically logged in, the corresponding game may be played in a state in which the record for the corresponding game is continuously maintained. That is, when the game was in a state of the level 6 immediately before the log-out is performed, even though the log-out is performed, the game may be played from the level 6. As the ID mapping information is stored in the server, even though the account of 'Hid1' is in a state in which it is logged out, the record in the account of 'SNo1' is continuously maintained. Therefore, the information on the game played after the log-out is also stored in the account of 'Hid1'.

Therefore, after the log-out of the account of 'Hid1' in the mobile terminal, the log-in may be performed using an account of 'Hid2', which is another game integration ID. It is assumed that the account of 'Hid2' has been already mapped to 'SNo2', which is a mobile ID of is another mobile terminal. Therefore, the log-in is performed using the account of 'Hid2', such that a game record stored in the account of 'Hid2' is loaded, the stored game record (for example, a record for a game played by other devices) is maintained, and the game is played. For example, when it is assumed that a result of the game played by the mobile terminal performing the log-in using the account of 'Hid2' or the mobile terminal setting 'SNo2', which is a mobile ID one-to-one mapped to Hid2', to the mobile ID is the level 6, the log-in is performed using the account of 'Hid2' in the mobile terminal, such that the game may be continuously played from the level 6. The case in which the game is played from the level 6 up to a level 9 is shown in FIG. 1.

Next, when the user logs in the game and plays the game using the account of 'Hid2 as described above and then logs out from the game, the log-in is again performed using 'SNo1', which is the mobile ID first set in the mobile terminal, such that the game starts. That is, as the game is played up to the level 9 in a state in which log-in is performed using the account of 'SNo1' before the log-in is performed using the account of 'Hid2', it is continuously played from the level 9 after the log-out.

According to exemplary embodiments of the present invention, when the device is initialized in the mobile terminal, 'SNo1', which is the mobile ID first set in the mobile terminal, is deleted in the mobile terminal and 'SNo3', which is a new mobile ID, is again set. As any game play record is not present in an account of newly set 'SNo3', the game is again played from the level 0.

When the log-in is again performed using the game integration account of 'Hid1' after the device is initialized as described above, the game is played by the record of 'SNo1', which is the mobile ID that has been already mapped to 'Hid1', but has been deleted from the corresponding mobile terminal. That is, the mobile terminal having the mobile ID corresponding to 'SNo1' mapped to the account of 'Hid1' is not present. However, as 'Hid1' and 'SNo1' are mapped to each other, they continuously share the mapped information with each other. Therefore, even when the log-in is performed using 'Hid1' after the device is initialized, 'Hid1' may not be mapped to 'SNo3'.

That is, in the case of performing the log-in using a specific game integration ID after the device is initialized, when the mobile ID that has been already mapped to the game integration ID by which the log-in is performed is present, as the already mapped mobile ID should be maintained, mapping to the mobile terminal is not performed. On the other hand, when the mobile ID mapped to the game integration ID by which the log-in is performed is not yet present, the game integration ID by which the log-in is performed is initialized and mapped to a newly created mobile ID. For example, although not shown in FIG. 1, after the device is initialized, the log-in is performed using 'Hid3', and the account of 'Hid3' is mapped to 'SNo3', which is a mobile ID newly created depending on the initialization of the device when the mobile ID mapped to 'Hid3' is not present.

System for Interworking Accounts

Figure 2:
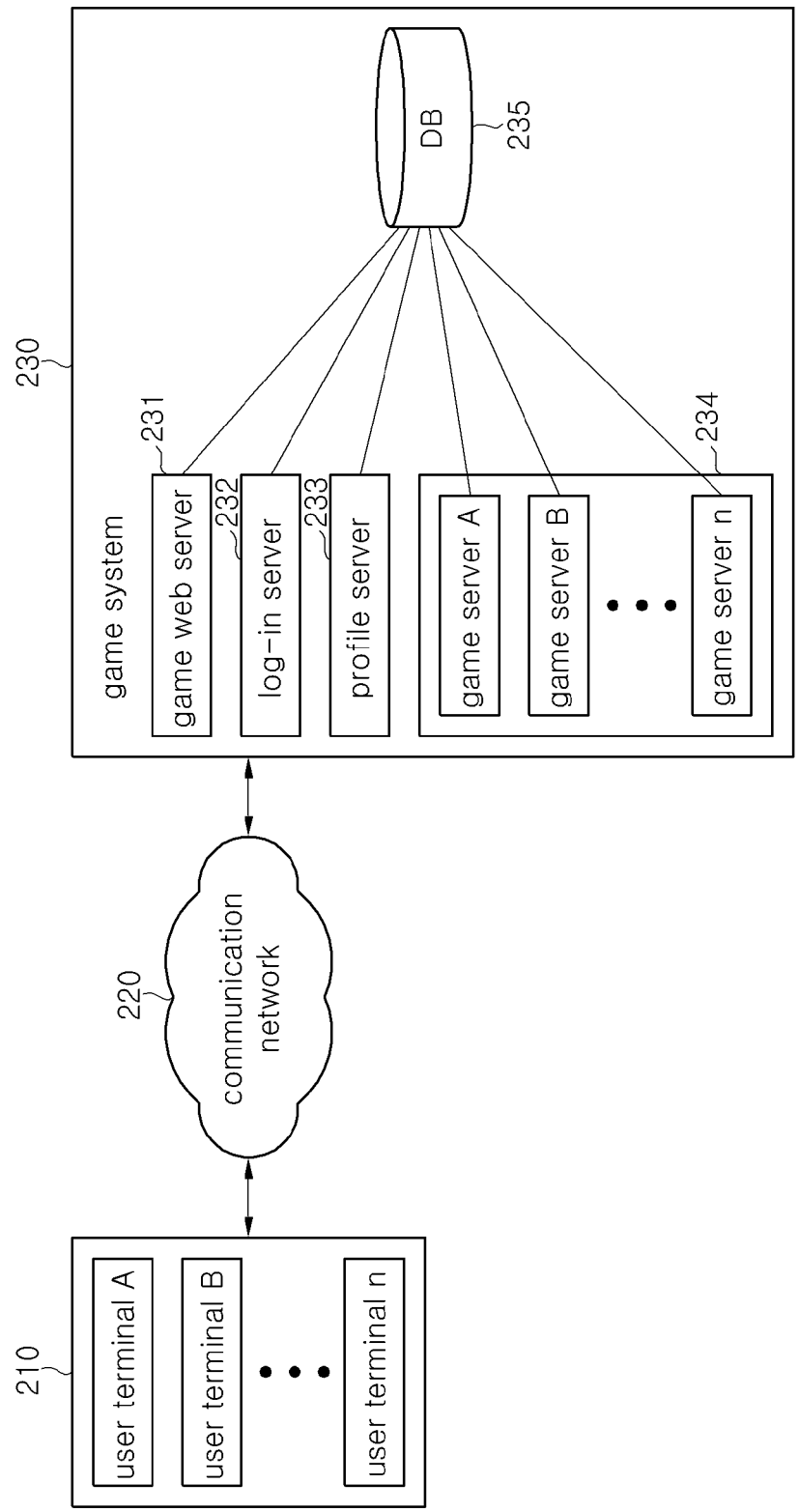
FIG. 2 illustrates a structure of a system according to exemplary embodiments of the present invention.

FIG. 2 illustrates a structure of a system according to exemplary embodiments of the present invention. Referring to FIG. 2, the system according to exemplary embodiments of the present invention may be configured to include a user terminal 210, a communication network 220, a game system 230, and the like. The game system 230 may be configured to include a game web server 231, a log-in server 232, a profile server 233, a plurality of game servers 234, a database 235, and the like.

The game system 230 provides data to the user terminals 210 through the communication network 220 so that various games may be played. The game system 230 may provide a game portal site and provide a plurality of games to the user through a single game platform. The user accesses the game web server 231 of the game system 230 using the user terminal 210 and selects a specific game on a main screen of the game web server 231 to play the corresponding selected game. The respective games may be managed and operated by the game servers 234.

The user may log in the corresponding gamer server 234 for each game to play the game or log in the plurality of games collectively managed by the game system 230 using a single integration ID to play the games. The log-in server 232 may provide an integration account capable of collectively logging in and managing the plurality of game servers 234, and the user may perform the log-in using the integration account (that is, a game integration ID) through the log-in server 232 to decrease an inconvenience od log-in for each game. One game integration ID or a plurality of game integration IDs may be created by a user and the games may be played using the plurality of game integration IDs even though the same games are played with the plurality of game integration IDs. Therefore, the same kind of games may be played in a state in which a plurality of records is managed for the same kind of games.

According to exemplary embodiments of the present invention, the log-in server 232 receives terminal identification information (for example, a terminal serial number, medium access control (MAC) information on a network, ID information of an operating system (for example, ANDROID, IOS, or the like), and the like) on the corresponding device from log-in clients of the respective user terminals 210 to confirm whether a mobile ID (for example, mobileID_1) for the corresponding user terminal 210 has been allocated through the profile server 233. When the log-in server 232 receives a log-in request from the user terminal 210, the log-in server 232 confirms an authentication value, or the like, and then returns profile information, or the like, to the user terminal 210.

When a specific game starts by the user terminal 210 by direct start without log-in, the log-in server 232 confirms device information of the user terminal 210 and returns mobile ID information already allocated to the user terminal 210 as described above to the user terminal 210. When the log-in is performed using a specific game integration ID in the user terminal 210, the mobile ID information connected to the corresponding game integration ID is confirmed by the profile server 233 and is transmitted to the user terminal 210, according to exemplary embodiments of the present invention.

The profile server 233 manages an allocation relationship between a value (that is, terminal identification information) capable of identifying the device (that is, the user terminal 210) and the mobile ID, a mapping relationship between the value and the game integration ID, and the like, in a form as shown in FIG. 3 according to exemplary embodiments of the present invention. When the profile server 233 receives a request from the log-in server 232, the profile server 233 retrieves profile information of the mobile ID, or the like, allocated to the corresponding user terminal 210 from the database 235 and returns the profile information to the log-in server 232.

That is, when the user terminal 210 accesses the game web server 231 to perform a log-in request using a specific game integration ID, the log-in server 232 confirms log-in information input through the user terminal 210 to perform authentication, receives the corresponding profile information depending on the log-in information through the profile server 233, and then transmits the profile information to the user terminal 210.

According to exemplary embodiments of the present invention, when direct start is executed with respect to a specific game without log-in by the user terminal 210, the log-in server 232 receives terminal identification information from the user terminal 210 and confirms whether the mobile ID has been allocated to the terminal identification information through the profile server 233. In the case the mobile ID is allocated to the terminal identification information, the log-in server returns the allocated mobile ID information to the user terminal 210. When the mobile ID is not allocated, a new mobile ID is created and is allocated to the terminal identification information.

According to exemplary embodiments of the present invention, when the log-in is performed using a specific game integration ID in the user terminal 210 as described above, the log-in server 232 confirms the mobile ID information mapped to the game integration ID used for the log-in through the profile server 233 and then returns the mobile ID information to the user terminal 210.

According to exemplary embodiments of the present invention a game system 230 of FIG. 2 includes the game web server 231, the log-in server 232, the profile server 233, the plurality of game servers 234, and the like, but the present invention is not limited thereto. That is, a plurality of servers may be integrated and operated in a single server, and functions performed in a single server may be each operated in a plurality of servers. Some or all of the functions of the respective servers shown as separate servers may also be partially or entirely integrated and operated with the other servers. The respective servers in the game system 230 may be operated by the same operator, and a plurality of operators may manage the respective servers and operate the respective servers to interwork with each other.

The communication network 220 may be configured regardless of a communication aspect, such as, wired communication and wireless communication, and may be various communication networks, such as, a personal area network (PAN), a local area network (LAN), a metropolitan area network (MAN), a wide area network (WAN), or the like. The communication network 410 may be the known World Wide Web (WWW) and use a wireless transmission technology used in short range communication, such as, infrared data association (IRDA) or BLUETOOTH.

Data transmitted between the user terminal 210 and the log-in server 232 of the game system 230 may be encoded using various types of security technologies.

For example, in order to initialize the mobile ID, a game client installed in the user terminal 210 performs an initialization call depending on execution of the game, and a client SDK performs client authentication processing. That is, a connection handle is created and initialized through the client SDK, and a serve publication key for a session (for example, a RSA key) is requested from the server. The service server (for example, the log-in server 232) requests an authentication center for, for example, the RSA key and provides a processing result to the user terminal 210. An authentication client of the user terminal 210 creates, for example, an AES key, encodes the AES key using the provided RSA key, and transmits the encoded AES key to the game system 230 to register a client secret key (AES key) for a session in the server.

The game system 230 registers the client secret key for a session and fetches member information allocated to the user terminal 210 to provide the member information to the user terminal 210.

The present invention is not limited to the above-mentioned authentication method. That is, any authentication method that may be applied in order to implement exemplary embodiments of the present invention.

FIG. 3 illustrates a data structure according to exemplary embodiments of the present invention. As described above with reference to FIG. 2, the terminal identification information, the mobile ID, the game integration ID, and the like are managed by the profile server 233, or the like, and may be mapped and thus managed as shown in FIG. 3.

The 'terminal identification information' includes unique information through which a specific mobile terminal may be identified as described above, and may, for example, be a terminal serial number, medium access control (MAC) information on a network, ID information of an operating system (for example, ANDROID, IOS, or the like), or the like.

Therefore, when the specific user terminal accesses the server, the terminal identification information on the user terminal is confirmed, and a new mobile ID is created and mapped to the terminal identification information when a mapped mobile ID is not present. For example, in FIG. 3, terminal identification information of a 'device A' is mapped to a mobile ID of 'mobileID_1' and terminal identification information of a 'device B' is mapped to a mobile ID of 'mobileID_2'.

The 'mobile ID' includes the ID information automatically created for the terminal identification information and one-to-one mapped and managed to the mobile terminal as described above. When the mobile ID is granted to a specific mobile terminal, automatic authentication and log-in may be performed using the granted mobile ID in the corresponding terminal without performing a separate log-in procedure by the user. Therefore, even though the user plays a game without performing the log-in, a play record may be stored by the mobile ID used for automatic log-in.

According to exemplary embodiments of the present invention, when the log-in is performed using a specific game integration ID in the user terminal and the mobile ID already mapped to the game integration ID used for the log-in is not present, the mobile ID mapped to the user terminal as described above is one-to-one mapped and managed to the game integration ID used for the log-in. For example, when the mobile ID allocated to the user terminal having the 'device A' as the terminal identification information is 'mobileID_1' as shown in FIG. 3 and the user terminal performs the log-in using the game integration ID, such as, 'hanID_1', when the mobile ID mapped to 'hanID_1' is not present, 'hanID_1', which is the game integration ID of the user terminal performing the log-in, is one-to-one mapped and managed to 'mobileID_1', which is the mobile ID of the user terminal. The above-mentioned mapping relationship may be maintained even though the device initialization of the user terminal is performed, and a new mobile ID may be allocated to the user terminal at the time of device initialization.

Again referring to FIG. 3, it is shown that a mobile ID, such as, 'mobile ID' is allocated to a 'device B' and a game integration ID matched to the 'device B' is not present, similar to the above-mentioned case. Therefore, when the user terminal of the 'device B' performs the log-in using the game integration ID, such as, 'hanID_1', as the mobile ID already mapped to the corresponding game integration ID is present, the game integration ID is not mapped to 'mobileID_2' allocated to the 'device B'. However, when the user terminal of the 'device B' performs the log-in using the game integration ID (for example, 'HanID_3') in which the mobile ID mapped to the 'device B' is not yet present, the corresponding game integration ID and 'mobileID_2, which is the mobile ID of the 'device B' are one-to-one mapped to each other.

The 'game integration ID' includes an ID provided by the game portal (for example, HANGAME of NAVER, or the like) providing the plurality of games through the single web server so that the respective users may simultaneously log in the plurality of games, as described above. The respective users may create and manage the single game integration ID or the plurality of game integration IDs. The users creating the plurality of game integration IDs may play games while managing separate records for each game integration ID with respect to the respective games.

Figure 4:
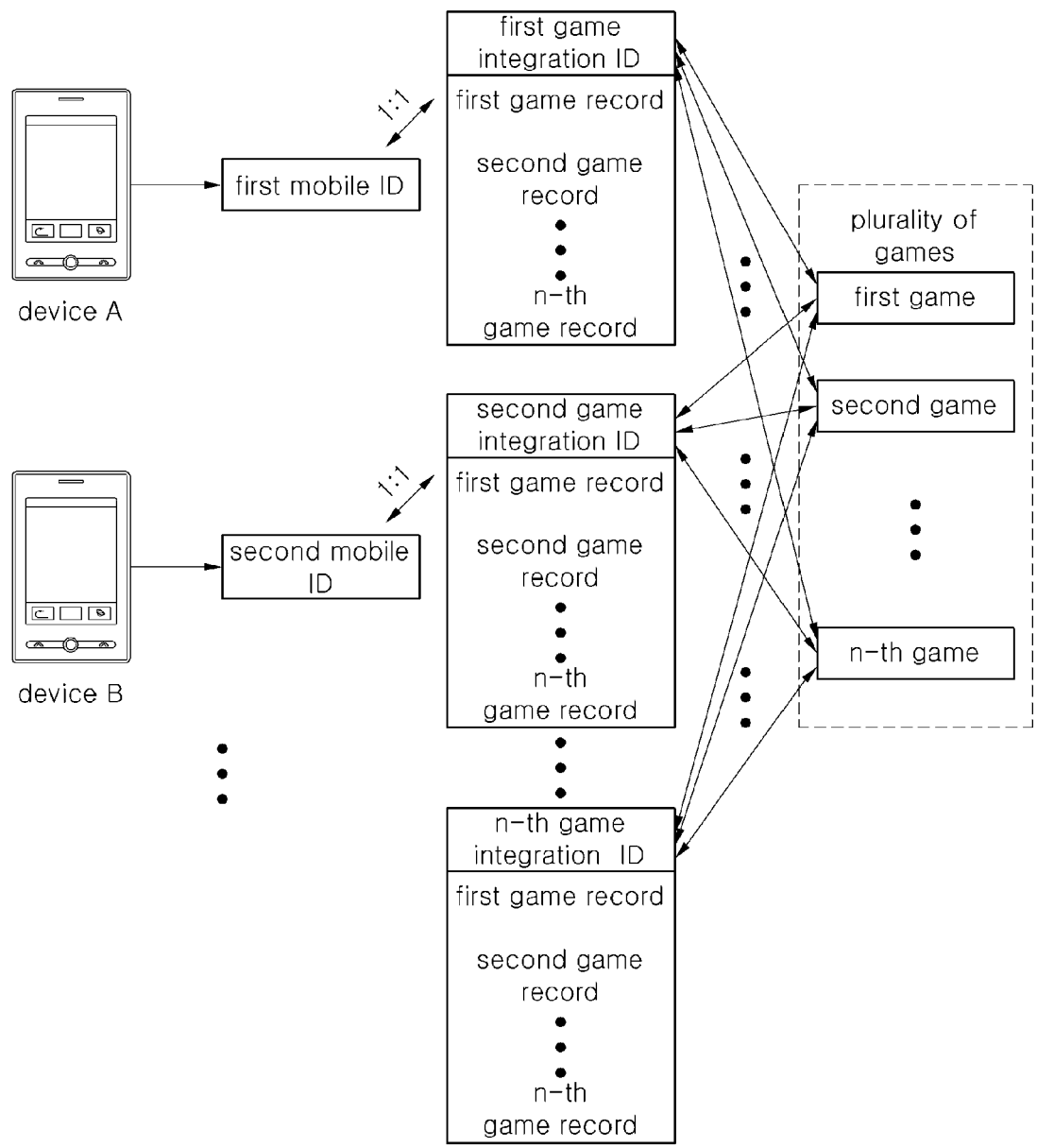
FIG. 4 illustrates a relationship between accounts according to exemplary embodiments of the present invention.

FIG. 4 illustrates a relationship between accounts according to exemplary embodiments of the present invention. Referring to FIG. 4, as described above, one mobile ID is allocated to the terminal identification information indicating unique device information of the respective user terminals. For example, a first mobile ID may be allocated to a device A, and a second mobile ID may be allocated to a device B.

According to exemplary embodiments of the present invention, when the log-in is performed using a specific game integration ID in the respective user terminals, when the mobile ID mapped to the game integration ID used for the log-in is not yet present, the mobile ID of the user terminal performing the log-in is one-to-one mapped and managed to the game integration ID used for the log-in. For example, when the log-in is performed using a first game integration ID in the user terminal of the device A, the first game integration ID is one-to-one mapped to the first mobile ID. Likewise, when the log-in is performed using a second game integration ID in the user terminal of the device B, the second game integration ID is one-to-one mapped to the second mobile ID.

A plurality of game records may be stored in the respective game integration IDs. That is, the user performing the log-in using a specific game integration ID may play a plurality of corresponding games, and play information on the respective games is managed in the corresponding game integration ID. Therefore, records for each game may be separately managed for each game integration ID.

As one user may create a plurality of game integration IDs, the user performs the log-in using a specific game integration ID among the plurality of game integration IDs created by him/her to play the game, thereby making it possible to maintain and manage different records for the same game.

According to exemplary embodiments of the present invention, as the game record is managed for each game integration ID, even when the same user plays the game using different user terminals, he/she logs in and play the game using a desired game integration ID, such that continuity for the game record may be secured.

Hereinafter, an apparatus for interworking an account based on a mobile terminal and an account based on a game will be described with reference to FIG. 5.

Apparatus for Interworking Accounts

Figure 5:
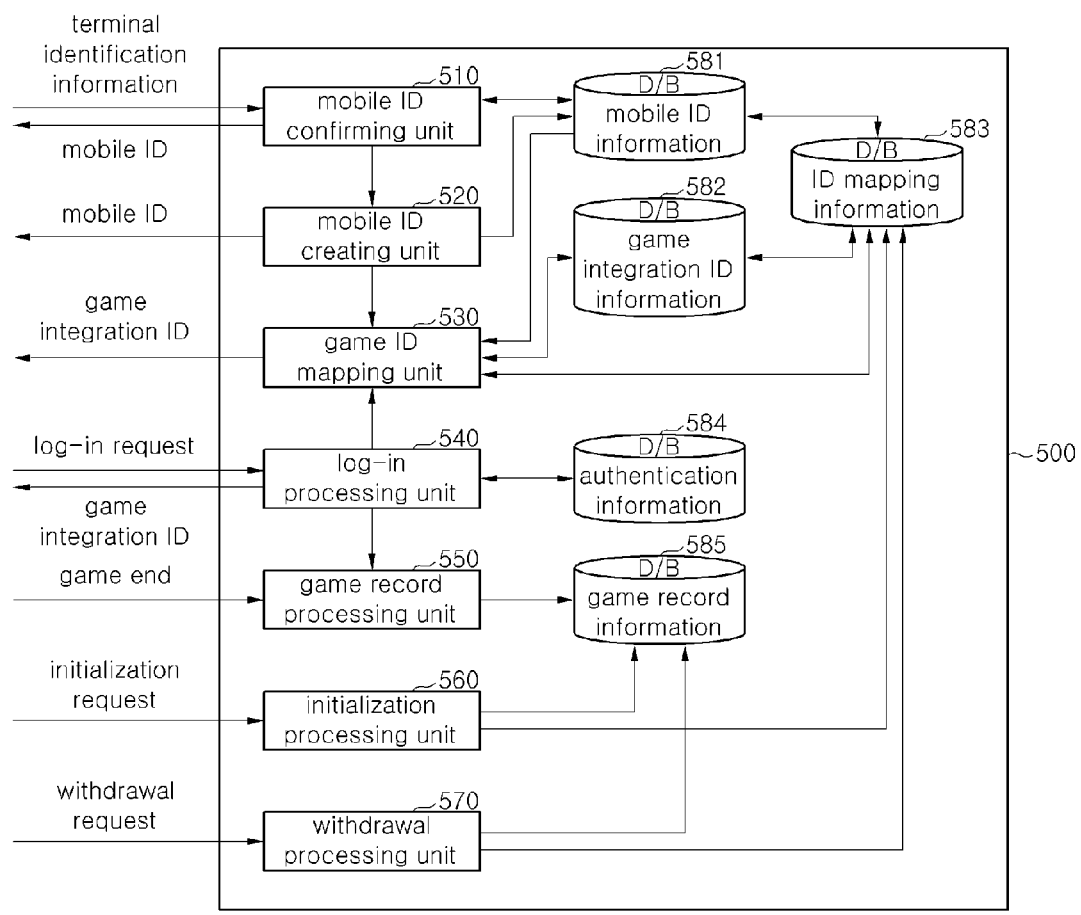
FIG. 5 is a block diagram illustrating a detailed structure of an apparatus for interworking accounts according to exemplary embodiments of the present invention.

FIG. 5 is a block diagram illustrating a detailed structure of an apparatus for interworking accounts according to exemplary embodiments of the present invention. The apparatus 500 for interworking accounts shown in FIG. 5 may correspond to any one or more of the game web server 231, the log-in server 232, and the profile server 233 shown in FIG. 2, and some and all of the functions of the apparatus 500 for interworking accounts may be performed by at least one of the servers.

The apparatus 500 for interworking accounts may be configured to include a mobile ID confirming unit 510, a mobile ID creating unit 520, a game ID mapping unit 530, a log-in processing unit 540, a game record processing unit 550, an initialization processing unit 560, a withdrawal processing unit 570, and the like. The apparatus 500 for interworking accounts may further include at least one database, such as, a mobile ID information database 581, a game integration ID information database 582, an ID mapping information database 583, an authentication information database 584, a game record information database 585, and the like.

The mobile ID confirming unit 510 serves to confirm whether a mobile ID has been allocated to a user terminal accessing a game system. The mobile IDs are allocated and managed to the respective user terminals, thereby making it possible to maintain the game records without performing the log-in using a specific game integration ID in the user terminals, and provide effective and convenient authentication system and record management by interworking the mobile ID and the game integration ID.

When the user wants to access the game system using the user terminal to play a specific game, the mobile ID confirming unit 510 receives terminal identification information for the user terminal and confirms whether a mobile ID corresponding to the terminal identification information has been allocated through the mobile ID information database 581.

Because of the confirmation, when the mobile ID corresponding to the terminal identification information has been already allocated, the mobile ID confirming unit 510 transmits the corresponding allocated mobile ID to the user terminal. On the other hand, when the mobile ID corresponding to the terminal identification information is not yet allocated, the mobile ID confirming unit 510 requests the mobile ID creating unit 520 to create and allocate a new mobile ID.

The mobile ID creating unit 520 creates the new mobile ID and allocates the created new mobile ID to the terminal identification information depending on the request of the mobile ID confirming unit 510 and stores the allocated information in the mobile ID information database 581. The mobile ID creating unit 520 transmits the allocated new mobile ID information to the user terminal.

Because of the confirmation by the mobile ID confirming unit 510, when the mobile ID corresponding to the terminal identification information is present and the specific game integration ID is mapped to the mobile ID, the game ID mapping unit 530 may further transmit the mapped game integration ID information to the user terminal. The game ID mapping unit 530 may confirm mapping information between the mobile ID stored in the ID mapping information database 583 and the game integration ID to determine whether they are mapped to each other.

The log-in processing unit 540 performs log-in processing when the log-in using the specific game integration ID of the user terminal is requested. The log-in processing unit 540 receives log-in related information, such as, an ID, a password, and the like, from the user terminal and compares the log-in related information with information stored in the authentication information database 584 to process the log-in.

The log-in processing unit 540 inquires the game ID mapping unit 530 about whether a specific mobile ID has been mapped to the game integration ID used for the log-in depending on the log-in. The log-in processing unit 540 inquires the game ID mapping unit 530 about the mapped mobile ID information. That is, the game ID mapping unit 530 inquires the ID mapping information database 583 about whether the mobile ID mapped to the game integration ID used for the log-in is present. Because of the inquiry, when the mobile ID mapped to the game integration ID is present, the corresponding mobile ID information is transmitted to the user terminal. Game record information stored for the corresponding game of the game integration ID in the game record information database 585 is read out and transmitted, thereby allowing the game to start in a stored game level state or level or at save point in progression through the game.

When the specific mobile ID is not mapped to the game integration ID used for the log-in, that is, when the mobile ID mapped to the game integration ID is not present as a result of inquiring the ID mapping information database 583 about whether the mobile ID mapped to the game integration ID used for the log-in is present by the game ID mapping unit 530, a mobile ID allocated to a user terminal currently accessing the game system is one-to-one mapped to the game integration ID used for the log-in and is stored in the ID mapping information database 583.

The log-in request may be made when the user selects a log-in menu in the user terminal or be made through a log-in menu automatically provided when the user executes a specific game (for example, a game requiring adult authentication, or the like) necessarily requiring the log-in.

The game record processing unit 550 receives game result information after the game is played through the user terminal and stores the game result in the game record information database 585. The game result for the specific game may be mapped to the mobile ID allocated to the user terminal and stored. When the user terminal performs the log-in using the specific game integration ID, the game result may be mapped to the game integration ID used for the log-in and stored.

The initialization processing unit 560 serves to initialize the mobile ID when initialization for the corresponding mobile ID is requested by the user terminal. That is, when initializing the mobile ID created by the mobile ID creating unit 520, or the like, with respect to the user terminal, the initialization processing unit 560 initializes the mobile ID depending on the request by the user. When the mobile ID is in a state in which it is mapped to the specific game integration ID, the state in which the mobile ID is mapped to the specific game integration ID is maintained as it is and a relationship between the mobile ID and the terminal identification information is released. As the mobile ID allocated to the terminal identification information of the user terminal is de-allocated, the terminal identification information of the user terminal is switched into a state in which the mobile ID is not allocated thereto. Therefore, when the user intends to play a specific game using the user terminal, a new mobile ID is created by the mobile ID confirming unit 510 and the mobile ID creating unit 520 and is allocated to the user terminal.

The withdrawal processing unit 570 deletes an account for the corresponding game integration ID when it receives a withdrawal request for the specific game integration ID from the user terminal. A preset grace period may be set and a mapping relationship between the game integration ID and the mapped mobile ID may be released depending on withdrawal processing.

The mobile ID information automatically allocated at the time of first playing the game in the respective mobile terminals is stored in the mobile ID information database 581. The respective mobile IDs may be mapped to unique terminal identification information through which the mobile terminals may be identified and stored. A mapping relationship between the mobile ID and the corresponding mobile terminal may also be released depending on the request for device initialization by the user.

Account information through which the user may access a game portal through a personal computer (PC), or the like, to simultaneously log-in a plurality of games to which he/she subscribes is stored in the game integration ID information database 582. In the game integration ID, as described above, a plurality of accounts may be created and managed by one user, and different game records for the respective different accounts may be managed.

Mapping information between the mobile ID stored in the mobile ID information database 581 and the game integration ID stored in the game integration ID information database 582 is stored in the ID mapping information database 583. The mapping relationship may be automatically set when the user performs the log-in using the specific game integration ID in the mobile terminal. According to exemplary embodiments of the present invention, the mapping relationship may be arbitrarily set by the user in an account menu of the mobile terminal.

Detailed examples of the initialization processing and the withdrawal processing will be described below in detail with reference to FIG. 12, FIG. 13, FIG. 14A, FIG. 14B, FIG. 15A and FIG. 15B.

A method for interworking accounts according to exemplary embodiments of the present invention will be described in detail with reference to FIG. 6, FIG. 7 and FIG. 8.

Method for Interworking Accounts

Figure 6:
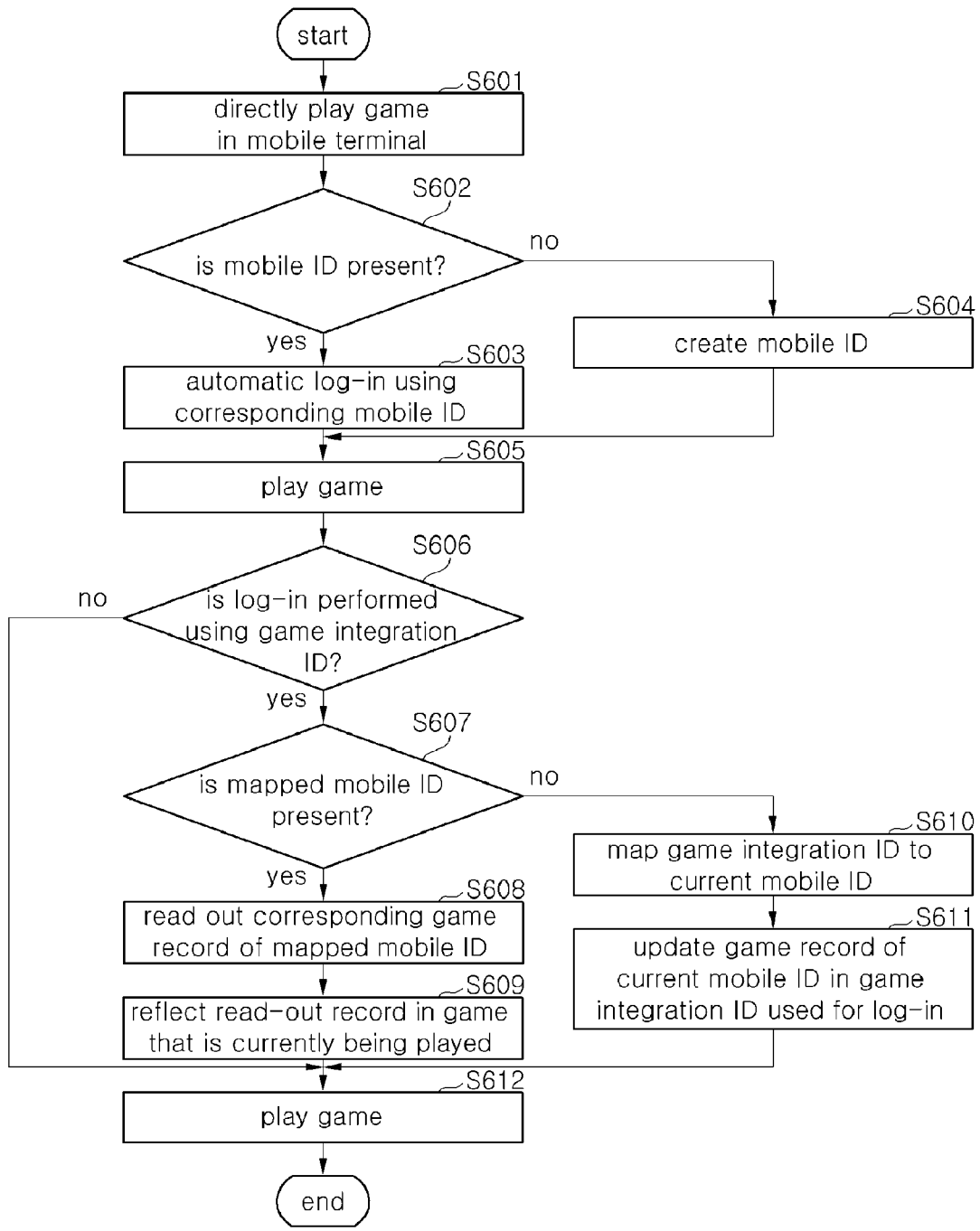
FIG. 6 is a flow chart illustrating a procedure for interworking an account based on a mobile terminal and an account based on a game according to exemplary embodiments of the present invention.

FIG. 6 is a flow chart illustrating a procedure for interworking an account based on a mobile terminal and an account based on a game according to exemplary embodiments of the present invention. Referring to FIG. 6, when a direct play starts for a specific game among a plurality of games installed in the mobile terminal (S601), whether the mobile ID allocated to the mobile terminal is present is confirmed (S602). Because of the confirmation, when the mobile ID allocated to the mobile terminal is present, automatic log-in is performed using the corresponding mobile ID (S603). When the mobile ID allocated to the mobile terminal is not yet present, a new mobile ID is created (S604). As described above, the automatic log-in is performed using the unique mobile ID allocated to the mobile terminal depending on the start of the game play to execute a game play (S605).

Therefore, game records for the played game are mapped to the mobile ID without allowing the user to perform a separate log-in process and stored. When the mobile ID is mapped to the specific game integration ID, the game records may also be mapped to the corresponding game integration ID and stored.

When performing the log-in using a specific game integration ID (S606) to play a game during the game play, whether the mobile ID mapped to the game integration ID used for the log-in is present is confirmed (S607). Because of the confirmation that the mobile ID mapped to the game integration ID is not present, whether the game integration ID mapped to the mobile ID of the current mobile terminal is present is confirmed. Because of the confirmation that the game integration ID mapped to the mobile ID of the current mobile terminal is not present, the mobile ID of the current mobile terminal and the game integration ID used for the log-in are one-to-one mapped to each other (S610). Due to the mapping, the game records for the game played using the mobile ID are also mapped to the game integration ID one-to-one mapped to the mobile ID. That is, game records of the current mobile ID are updated in the game integration ID used for the log-in (S611).

On the other hand, because of the confirmation in step (S607) that the mobile ID mapped to the game integration ID used for the log-in is present, corresponding game records of the corresponding game integration ID or corresponding game records of the mapped mobile ID are read out or transmitted from the server (S608), the read-out game records are reflected in the game that is being currently played (S609), and the game is played (S612). The game play record is stored in the corresponding game integration ID and the mobile ID mapped to the game integration ID before log-out from the game integration ID used for the log-in.

Figure 7:
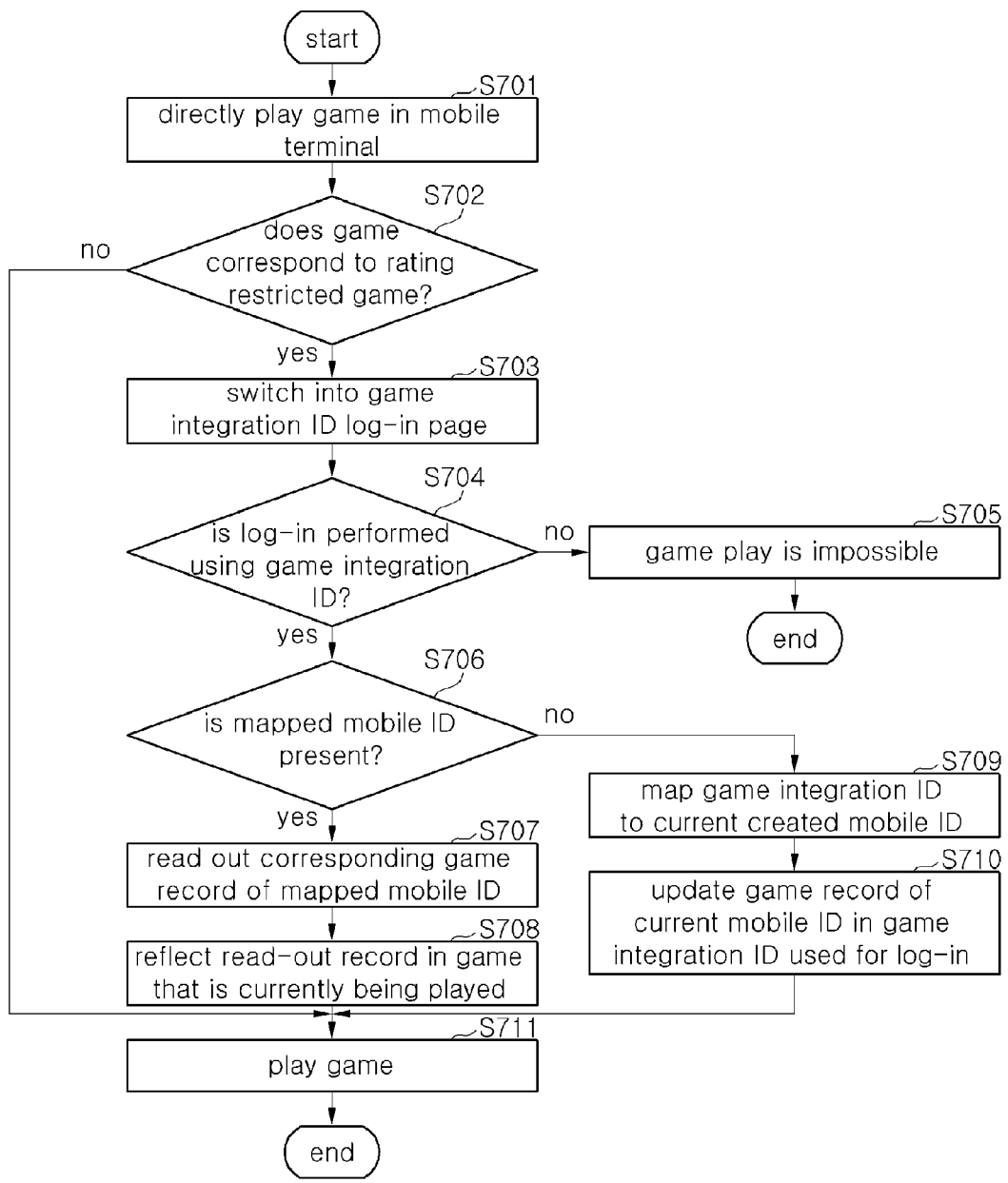
FIG. 7 is a flow chart illustrating an account managing procedure for a rating restricted game according to exemplary embodiments of the present invention.

FIG. 7 is a flow chart illustrating an account managing procedure for a rating restricted game according to exemplary embodiments of the present invention. Referring to FIG. 7, when a direct play starts for a specific game among a plurality of games installed in the mobile terminal (S701), the automatic log-in is performed using the unique mobile ID allocated to the mobile terminal through a procedure of confirming whether the mobile ID allocated to the mobile terminal is present to execute a game play, as described above with reference to FIG. 6.

When a game to be played is a rating restricted game (S702), it is difficult to perform authentication only with the mobile ID. Inducing a log-in procedure using the game integration ID through which authentication is possible. Therefore, when the game to be played is the rating restricted game (for example, a game that should be played only by a person over the age of 19), a switch into a log-in page for the game integration ID is performed (S703) to induce the log-in.

When the user does not perform the log-in using the game integration ID, a play for the corresponding game is not permitted or impossible (S705). When the user performs the log-in using the specific game integration ID (S704) complete authentication for the corresponding game, whether the mobile ID mapped to the game integration ID used for the log-in is present (S706) is determined as described above with reference to FIG. 6. Because of the confirmation that the mobile ID mapped to the game integration ID is not present, whether the game integration ID mapped to the mobile ID of the current mobile terminal is present is confirmed. Because of the confirmation that the game integration ID mapped to the mobile ID of the current mobile terminal is not present, the mobile ID of the current mobile terminal and the game integration ID used for the log-in are one-to-one mapped to each other (S709). Due to the mapping, the game records for the game played using the mobile ID are also stored in the game integration ID one-to-one mapped to the mobile ID. That is, game records of the current mobile ID are updated in the game integration ID used for the log-in (S710).

On the other hand, as a result of the confirmation in step (S706), when the mobile ID mapped to the game integration ID used for the log-in is present, corresponding game records of the corresponding game integration ID or corresponding game records of the mapped mobile ID are read out or queried from the server (S707), the read-out game records are reflected in the game that is being currently played (S708), and the game is played (S711). The game play record is stored in the corresponding game integration ID and the mobile ID mapped to the game integration ID before log-out from the game integration ID.

Figure 8:
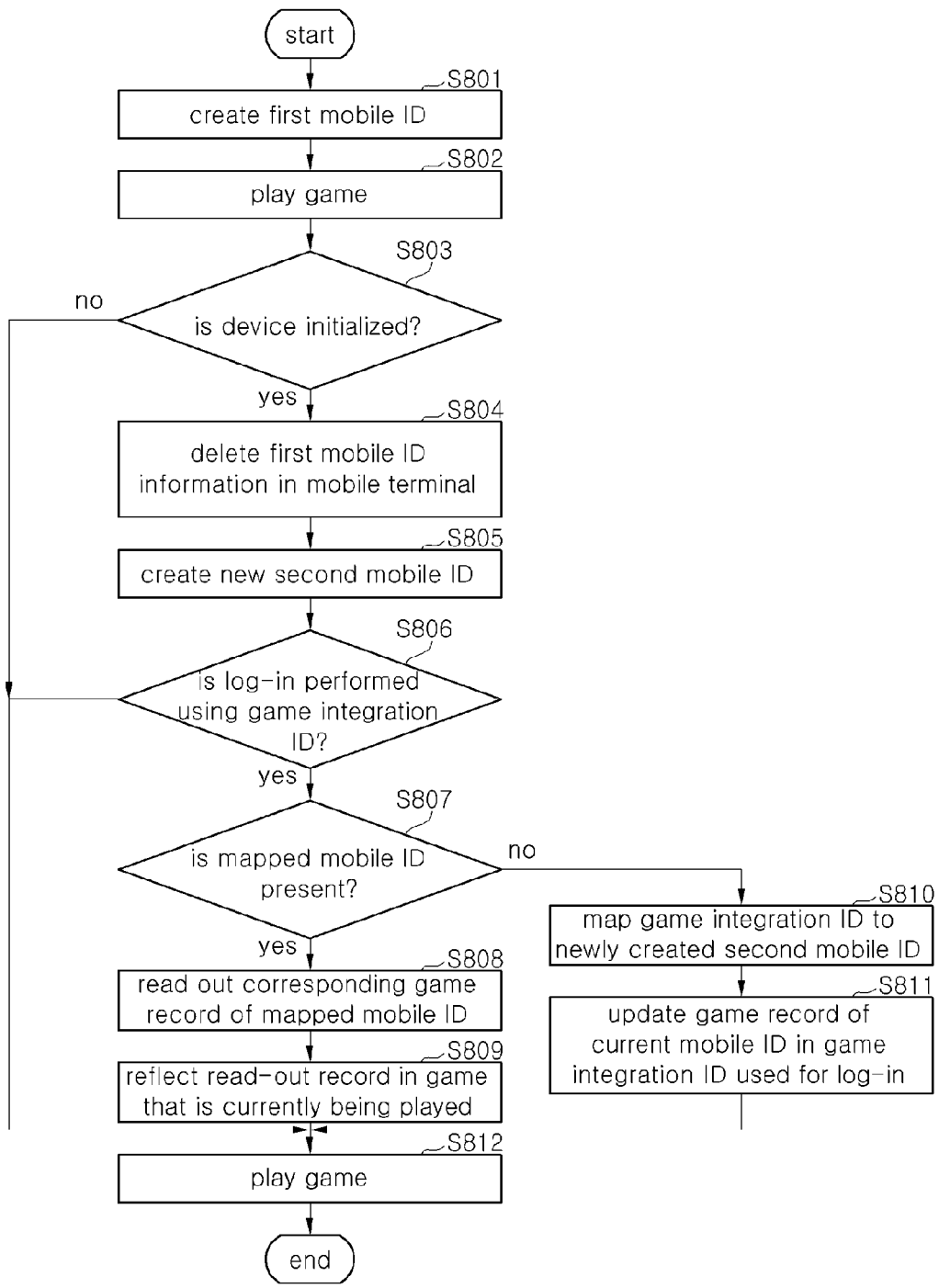
FIG. 8 is a flow chart illustrating a procedure for interworking accounts according to device initialization according to exemplary embodiments of the present invention.

FIG. 8 is a flow chart illustrating a procedure for interworking accounts depending on device initialization according to exemplary embodiments of the present invention. Referring to FIG. 8, when a direct play starts for a specific game among a plurality of games installed in the mobile terminal, the automatic log-in is performed using the unique mobile ID allocated to the mobile terminal through a procedure of confirming whether the mobile ID allocated to the mobile terminal is present to play a game (S802), as described above with reference to FIG. 6 and FIG. 7. When it is assumed that the mobile ID created for the mobile terminal is a first mobile ID (S801), device initialization for the already allocated first mobile ID may be performed (S803).

As described above, in the case of performing the device initialization, information on the first mobile ID allocated to the current mobile terminal is deleted (S804). Then, a second mobile ID different from the first mobile ID is created (S805).

Next, in the case of performing the log-in using a specific game integration ID (S806) to play a game during the game play, whether the mobile ID mapped to the game integration ID used for the log-in is present is confirmed (S807). As a result of the confirmation, when the mobile ID mapped to the game integration ID is not present, whether the game integration ID mapped to the mobile ID (that is, the second mobile ID) of the current mobile terminal is present is confirmed. As the second mobile ID is an ID newly created by the device initialization, the mapped game integration ID is not present.

That is, as a result of the confirmation, when the game integration ID mapped to the mobile ID of the current mobile terminal is not present, the second mobile ID, which is the mobile ID of the current mobile terminal, and the game integration ID used for the log-in are one-to-one mapped to each other (S810). Due to the mapping, the game records for the game played using the second mobile ID are also mapped to the game integration ID that is one-to-one mapped to the mobile ID. That is, game records of the second mobile ID, which is the mobile ID of the current mobile terminal, are updated for the game integration ID used for the log-in (S811).

On the other hand, as a result of the confirmation in step (S807), when the mobile ID mapped to the game integration ID used for the log-in is present, corresponding game records of the corresponding game integration ID or corresponding game records of the mapped mobile ID are read out from the server (S808), the read-out game records are reflected in the game that is being currently played (S809), and the game is played (S812). The game play record is stored in the corresponding game integration ID and the mobile ID mapped to the game integration ID before log-out from the game integration ID used for the log-in (for example, the second mobile ID or another mobile ID).

Hereinabove, the apparatus and the method according to exemplary embodiments of the present invention have been described. Hereinafter, examples in which the present invention described above is applied to a real game will be described in detail with reference to FIG. 9, FIG. 10, FIG. 11, FIG. 12, FIG. 13, FIG. 14A, FIG. 14B, FIG. 15A, FIG. 15B, FIG. 16A, FIG. 16B, FIG. 17, FIG. 18, FIG. 19A, FIG. 19B, FIG. 19C, FIG. 19D, FIG. 19E, FIG. 20A, FIG. 20B, FIG. 20C, FIG. 20D and FIG. 20E.

EXAMPLES

Figure 9:
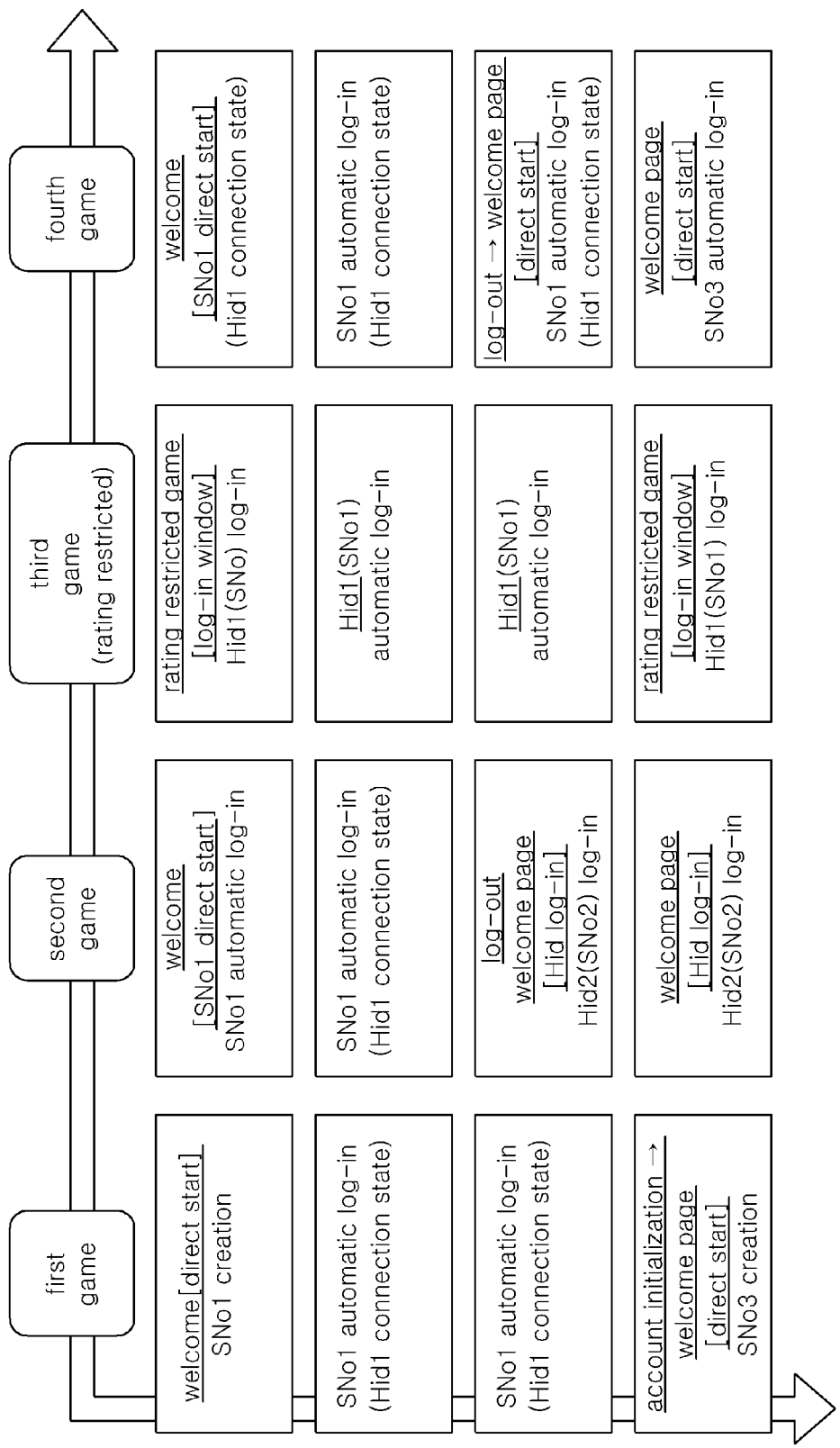
FIG. 9 illustrates a basic authentication procedure applied to a real game according to exemplary embodiments of the present invention.

FIG. 9 illustrates a basic authentication procedure applied to a real game according to exemplary embodiments of the present invention. Referring to FIG. 9, it is assumed that a game platform providing integration log-in provides, for example, four games (first to fourth games). The third game, which is a rating restricted game, necessarily requires the log-in.

Remaining games except for the third game requiring authentication through the log-in may be played without separate log-in according to exemplary embodiments of the present invention, and game play records depending on the playing of the game may be automatically stored and maintained. In examples to be described below, an ID denoted by 'SNo' includes a mobile ID, and an ID denoted by 'Hid' includes a game integration ID.

In FIG. 9, a horizontal direction includes play switching between games in a single game, and a vertical direction indicates an example depending on the log-in for the specific same game.

That is, when the first game directly starts, a game first play page (for example, a welcome page) is provided. According to exemplary embodiments of the present invention, before the mobile ID is created, a new mobile ID (for example, SNo1) is created as described above. Therefore, a play record of the first game is mapped to SNo1 without a separate log-in process and stored.

Next, when the first game is switched into the second game and the second game directly starts, a game first play page for the second game is provided. Likewise, the automatic log-in is performed using SNo1 created as described above without a separate log-in process, such that the second game is played.

In the case of intending to switch the second game into the third game and directly start the third game, as the third game is the rating restricted game, an authentication procedure through a separate log-in process can be performed. A log-in window can be provided, before moving to a game first play page to induce the user to perform the log-in. Therefore, when the user performs the log-in using the specific game integration ID (for example, Hid1) and the authentication procedure is normally completed, the game is played in a state in which the log-in is performed using Hid1. According to exemplary embodiments of the present invention, when the mobile ID mapped to Hid1, which is the game integration ID used for the log-in, is not yet present, SNo1, which is the mobile ID created in the mobile terminal is one-to-one mapped to Hid1. Therefore, a game record for the game logged in and played using Hid1 is also stored in SNo1.

Next, when the fourth game is played, as the automatic log-in has been performed using SNo1 as in the second game, the game is played by SNo1. As the third game is logged in using Hid1, such that SNo1 is mapped to Hid1, a game record for the game played using SNo1 is also maintained in Hid1.

Next, when the first or second game is played, as the automatic log-in has been performed using SNo1 and the log-in has been performed using the game integration ID, such as, Hid1, even though the first game is not logged in using a separate game integration ID, a log-in state using Hid1 may be applied. Likewise, the second game is played in a state in which Hid1 is connected.

In the case of again playing the third game, as the third game has been already logged in using Hid1, the third game may be played in a state in which it is automatically logged in using Hid1 before separate log-out is performed. Also in the case of playing the fourth game, the same process as those of the first and second games is applied to the fourth game.

Subsequently, when log-out from the second game is performed for Hid1 and the second game is relogged in using Hid2, a game play record for Hid2 is applied to the second game. The log-out and the relog-in may be implemented to have an effect on other games or so as not to have an effect on other games. Therefore, in the case of implementing the log-out and the relog-in so as not to have an effect on other games, the third game is played in a state in which it is automatically logged in continuously using Hid1. Here, it is assumed that Hid2 is already one-to-one mapped to SNo2.

When log-out from the fourth game is performed for Hid1 as in the second game and log-in is not performed using a new game integration ID unlike the second game, as automatic log-in is performed using SNo1, which is the current mobile ID, the game record is stored in SNo1, similar to the case before the log-in is performed using Hid1. As SNo1 has been one-to-one mapped to Hid1 as described above, although log-out for Hid1 has been performed as described above, the game record may also be stored in Hid1 due to interworking between SNo1 and Hid1.

According to exemplary embodiments of the present invention, when an account is initialized after the first game is played, initialization for SNo1 is performed as described above with reference to FIG. 8. Therefore, a mapping relationship between SNo1, which is the mobile ID mapped to the corresponding mobile terminal, and the corresponding mobile terminal is released. As described above, when the first game is again played in a state in which the mobile ID is released, SNo3, which is a new mobile ID, is created. In the subsequent games, automatic log-in is performed using SNo3, such that a game play record is stored.

Therefore, when the second game is played after the account in the first game is initialized, as the second game in a state in which it is already logged in using Hid2, the game record is stored in Hid2 regardless of the initialization. As Hid2 is in a state in which it is one-to-one mapped to SNo2, the game play record for the second game may also be stored mapped to SNo2.

Even though the third game is in a state in which it is logged in using Hid1, as an account for SNo1 in the first game is in a state in which it is initialized, relog-in using Hid1 may be performed. Next, in the case of playing the fourth game, even though the log-out for Hid1 is performed and the automatic log-in is performed only using SNo1, after the account in the first game is initialized, as the current mobile terminal is in a state in which the automatic log-is performed using SNo3 rather than SNo1, the fourth game is also automatically logged in using SNo3. Therefore, in the case of intending to continuously play the fourth game with the game record of SNo1, relog-in is performed using Hid1 maintained in a state in which it is one-to-one mapped to SNo1 to play the fourth game, thereby making it possible to play the fourth game in a state in which the corresponding record is fetched.

Figure 10:
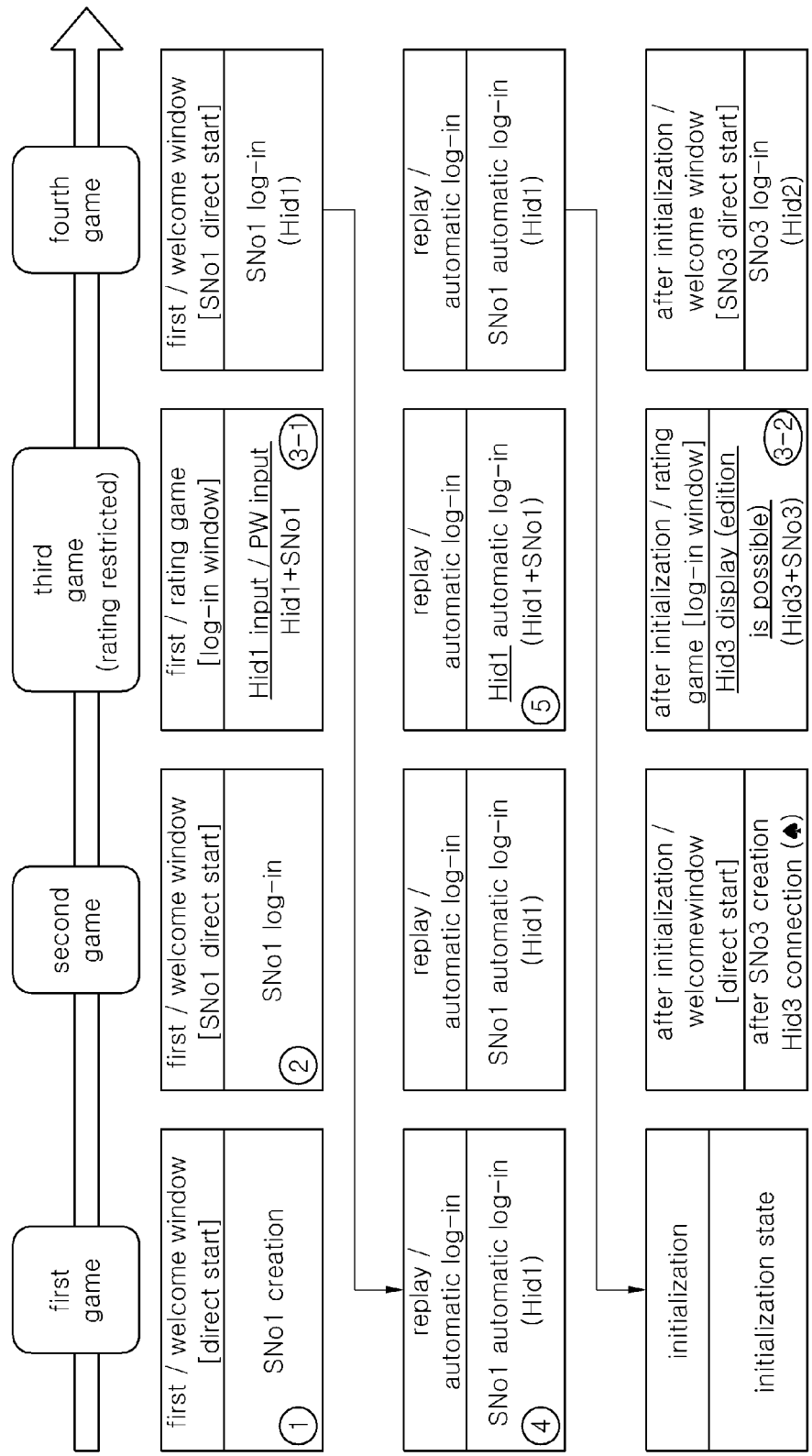
FIG. 10 illustrates an authentication procedure applied at the time of start of the real game according to exemplary embodiments of the present invention.

FIG. 10 illustrates an authentication procedure applied at the time of start of the real game according to exemplary embodiments of the present invention. Referring to FIG. 10, when the first game directly starts as in FIG. 9, a game first play page (for example, a welcome page) is provided. According to exemplary embodiments of the present invention, before the mobile ID is created, a new mobile ID (for example, SNo1) is created as described above. Therefore, a play record of the first game is mapped to SNo1 without a separate log-in process and stored. In the case of first playing all games except for the rating restricted game in the corresponding mobile terminal or in the case of initialization, when the mobile ID is not present, the game first play page is provided, such that the game may be directly played and the mobile ID for the mobile terminal is automatically created.

Next, when the first game is switched into the second game and the second game is directly starts, a game first play page for the second game is provided. Likewise, the automatic log-in is performed using SNo1 created as described above without a separate log-in process, such that the second game is played. That is, as the mobile ID for the mobile terminal has been already created, the second game is automatically logged in using SNo1.

In the case of intending to switch the second game into the third game and directly start the third game, as the third game is the rating restricted game, an authentication procedure through a separate log-in process may be performed. A log-in window can be provided before moving to a game first play page to induce the user to perform the log-in. Therefore, when the user performs the log-in using the specific game integration ID (for example, Hid1) and the authentication procedure is normally completed, the game is played in a state in which the log-in is performed using Hid1. According to exemplary embodiments of the present invention, when the mobile ID mapped to Hid1, which is the game integration ID used for the log-in, is not yet present, SNo1, which is the mobile ID created in the mobile terminal is one-to-one mapped to Hid1. Therefore, a game record for the game logged in and played using Hid1 is also stored in SNo1. Mapping between SNo1 and Hid1 may be continuously maintained even after the account is initialized.

Next, when the fourth game is played, as the automatic log-in has been performed using SNo1 as in the second game, the game is played by SNo1. As the third game is logged in using Hid1, such that SNo1 is mapped to Hid1, a game record for the game played using SNo1 is also maintained in Hid1.

Next, when the first or second game is played, as the automatic log-in has been performed using SNo1 and the log-in has been performed using the game integration ID, such as, Hid1, even though the first game is not logged in using a separate game integration ID, a log-in state using Hid1 may be applied. Likewise, the second game is played in a state in which Hid1 is connected. That is, even though a direct log-in action using Hid is not present, in the case of connecting Hid to the same SNo in another application (the third game in the above example), a connection state of Hid may be shared.

In the case of again playing the third game, as the third game has been already logged in using Hid1, the third game may be played in a state in which it is automatically logged in using Hid1 before separate log-out is performed. When the direct log-in action using Hid is present as described above, a state in which the log-in is performed using the corresponding Hid is maintained. Next, in the case of playing the fourth game, a state in which automatic log-in is performed using SNo1 is maintained, similar to the first and second games.

According to exemplary embodiments of the present invention, when the account is initialized, initialization for SNo1 is performed as described above with reference to FIG. 8. Therefore, a mapping relationship between SNo1, which is the mobile ID mapped to the corresponding mobile terminal, and the corresponding mobile terminal is released. As described above, when the second game is again played in a state in which the mobile ID is released, SNo3, which is a new mobile ID, is created. In the subsequent games, automatic log-in is performed using SNo3, such that a game play record is stored. Therefore, when the second game is played after the account is initialized, the second game is played using SNo3 and the log-in is again performed using Hid3, such that Hid3 and SNo3 may be one-to-one mapped to each other.

In the case of playing the third game, which is the rating restricted game, after the initialization, when the second game has been logged in using Hid3, a separate log-in procedure may also be omitted. When SNo3, which is the current mobile ID, and Hid3 are connected to each other, Hid may be displayed and edited.

Next, in the case of playing the fourth game, even though the automatic log-in is performed only using SNo1, after the account is initialized, as the current mobile terminal is in a state in which the automatic log-is performed using SNo3 rather than SNo1, the fourth game is also automatically logged in using SNo3.

Figure 11:
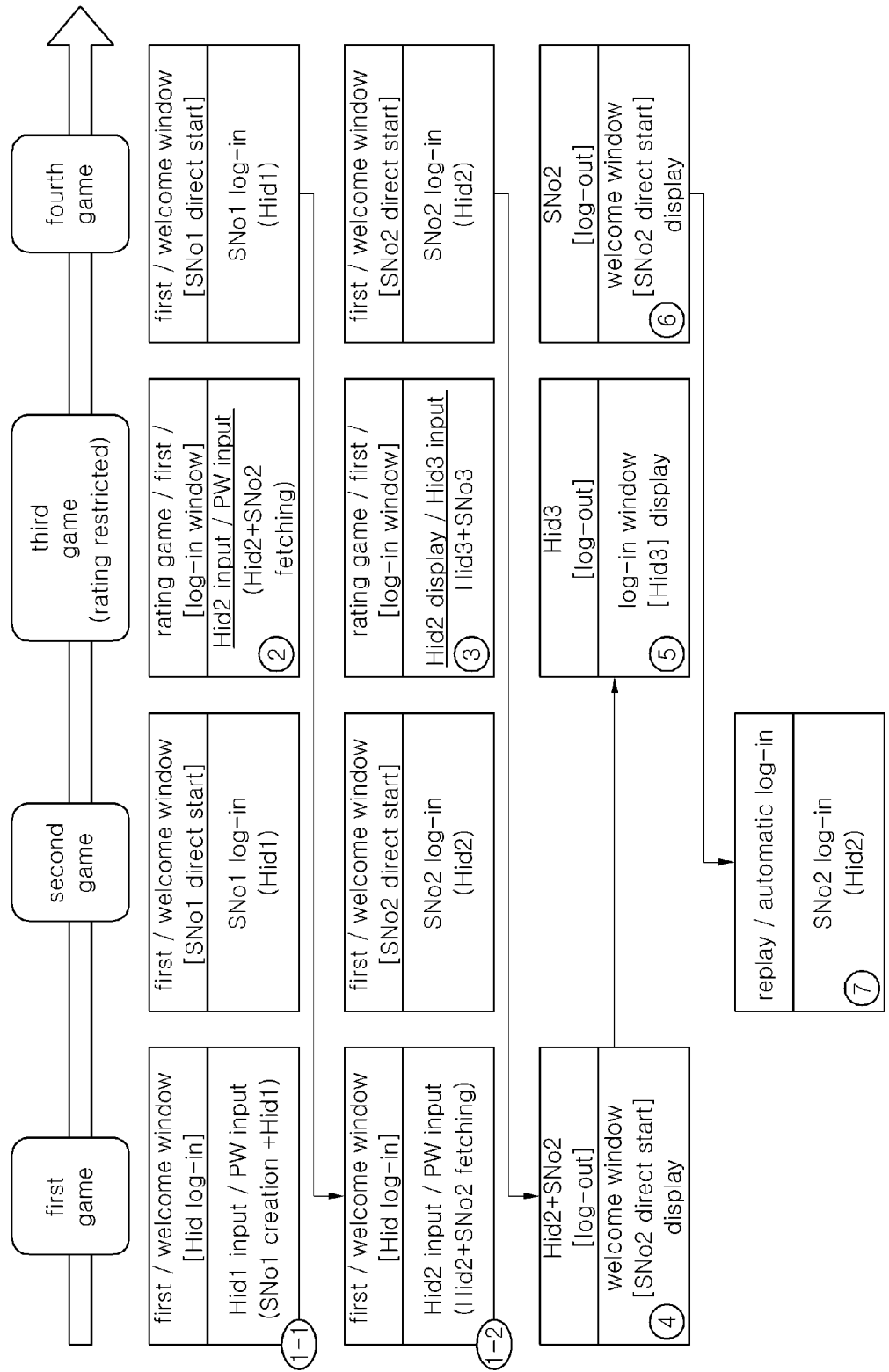
FIG. 11 illustrates log-in and log-out procedures of a game integration account applied to the real game according to exemplary embodiments of the present invention.

FIG. 11 illustrates log-in and log-out procedures of a game integration account applied to the real game according to exemplary embodiments of the present invention. Referring to FIG. 11, when the first game directly starts as in FIG. 9 and FIG. 10, a game first play page (for example, a welcome page) is provided. According to exemplary embodiments of the present invention, before the mobile ID is created, a new mobile ID (for example, SNo1) is created as described above. Therefore, a play record of the first game is mapped to SNo1 without a separate log-in process and stored. In the case of performing the log-in using Hid1 in a Hid log-in window, the created SNo1 and Hid1 are one-to-one mapped to each other. When the mobile ID that has been mapped to Hid1 is not present, it is possible to map Hid1 and SNo1 to each other.

Next, when the first game is switched into the second game and the second game directly starts, a game first play page for the second game is provided. Likewise, the automatic log-in is performed using SNo1 created as described above without a separate log-in process, such that the second game is played. That is, as the mobile ID for the mobile terminal has been already created, the second game is automatically logged in using SNo1. As Hid1 and SNo1 are one-to-one mapped to each other in the first game, the play record in the second game may also be stored mapped to Hid1.

In the case of intending to switch the second game into the third game and directly start the third game, as the third game is the rating restricted game, an authentication procedure through a separate log-in process may be performed. A log-in window may be performed before moving to a game first play page to induce the user to perform the log-in. The log-in may be performed using another game integration ID rather than Hid1 used to log in the first game. For example, the log-in may be performed using Hid2. When another SNo (for example, SNo2) is connected to Hid2, the corresponding SNo (that is, SNo2) may be fetched, and the fetched SNo2 may be set to SNo of the current mobile terminal. However, the above setting does not have an effect on other applications.

Therefore, next, when the fourth game is played, it may be automatically logged in and played using SNo1.

Hid2 may be again input in the first game to log in the first game. Therefore, the first game is logged in and played using Hid2, and SNo2 mapped to Hid2 is fetched, such that the game record interworks between Hid2 and SNo2. When the log-in is performed using Hid2 in a state in which SNo is not present in the current mobile terminal, SNo2 mapped to Hid2 to thereby be fetched may also be set to SNo of the current mobile terminal.

Next, when the second game is played, as SNo2 is in a state in which it is set to the mobile ID, the second game is in a state in which it is automatically logged in using SNo2. As SNo2 is in a state in which it is one-to-one mapped to Hid2, the play record of the second game interworks between SNo2 and Hid2.

In the case of again playing the third game, as the third game has been already logged in using Hid2, the third game may be played in a state in which it is automatically logged in using Hid2 before separate log-out is performed. However, the log-in may also be again performed using Hid3. When SNo connected to Hid3 again used for the log-in is not present, as SNo1 or SNo2 has been already mapped to other Hid, a new SNo (that is, SNo3) may be again created and mapped.

Next, in the case of playing the fourth game, as the current mobile ID is set to SNo2 after the first game is logged in using Hid2, the fourth game is maintained in a state in which it is automatically logged in using SNo2, similar to the second game. As SNo2 is in a state in which it is one-to-one mapped to Hid2, the play record of the second game interworks between SNo2 and Hid2.

According to exemplary embodiments of the present invention, in the case of again performing the log-out for Hid2 from the first game, the game first start screen is again provided. Even though the log-out for Hid2 is performed, as the current mobile ID is in a state in which it is set to SNo2, the first game may directly start in a state in which it is automatically logged in using SNo2.

On the other hand, in the case of performing the log-out for Hid3 from the third game, as the third game is the rating restricted game, the log-in window is again provided, and Hid (that is, Hid3) for which the log-out has been performed may be displayed on the screen.

Next, when the fourth game is played, as the log-out for Hid2 from the first game is performed and the mobile ID is set to SNo2, the game first start screen is provided, and the fourth game may directly start in a state in which it is automatically logged in using SNo2.

As described above, authentication is separated between applications, such that authentication management for the respective games may be effectively performed. That is, the corresponding application may be automatically logged in regardless of log-out of other applications.

Figure 12:
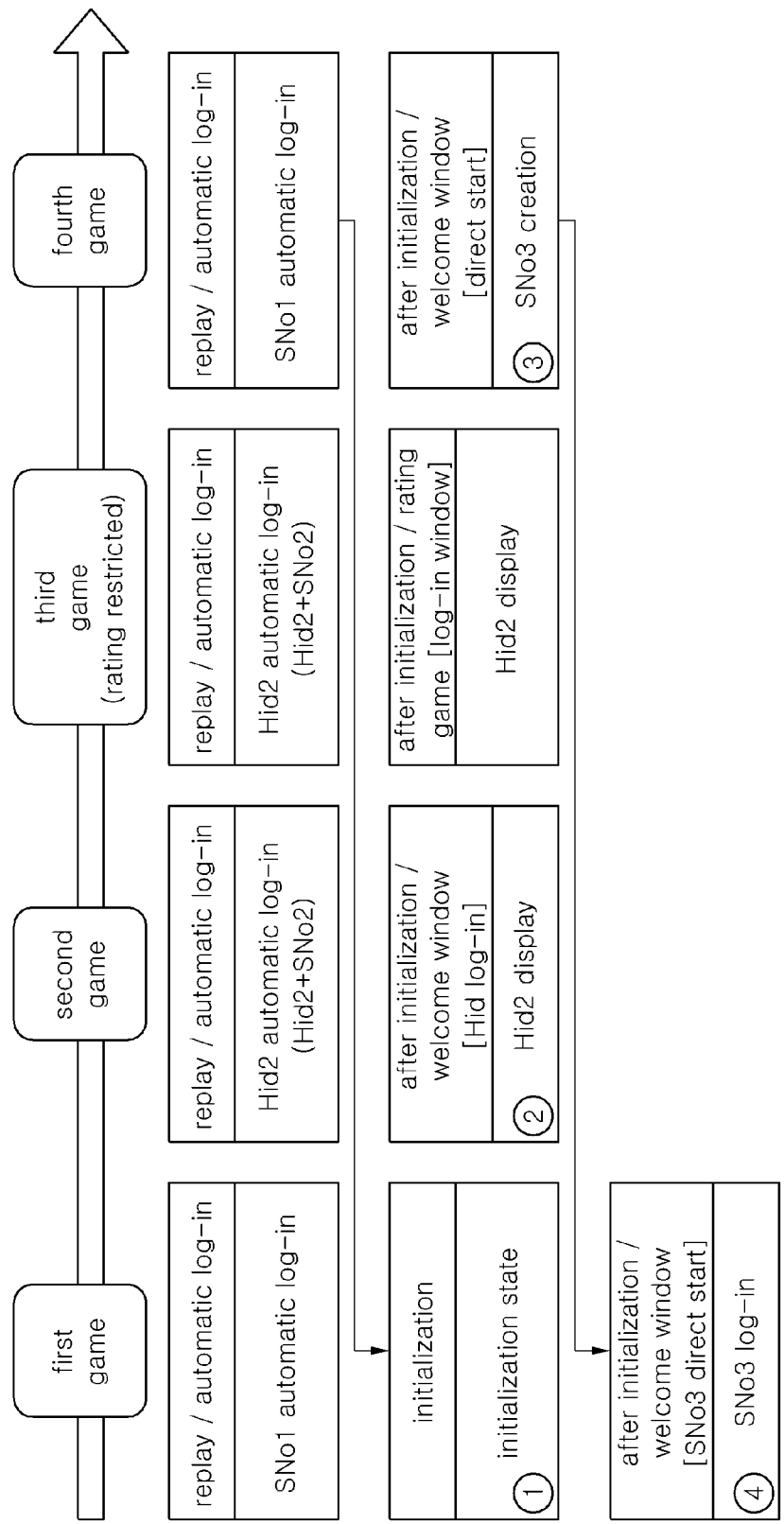
FIG. 12 illustrates an account initializing procedure applied to the real game according to exemplary embodiments of the present invention.

FIG. 12 illustrates an account initializing procedure applied to the real game according to exemplary embodiments of the present invention. Referring to FIG. 12, as the log-out for Hid2 is performed in a state in which the mobile ID of the mobile terminal is allocated to SNo1 as in FIG. 11, in the case of again playing the first game, the first game is automatically logged in using SNo1.

Further, in FIG. 11, as the second game is maintained in a state in which it is logged in using Hid2, when the second game is again played, it is automatically logged in using Hid2. As SNo2 is one-to-one mapped to Hid2, the play record for the second game may interwork and be managed between Hid2 and SNo2. Further, when the third game is again played, it may be automatically logged in using Hid2, and when the fourth game is again played, it may be automatically logged in using SNo1.

When the device initialization of the mobile terminal is performed, SNo1, which is the mobile ID allocated to the mobile terminal, is initialized. That is, link of SNo1 of the mobile terminal is released. However, the mapping relationship between SNo1 and Hid1 may be maintained, and a record for the mapping relationship may be maintained. A list of games that are not logged in using a separate game integration ID, but are being used in a state in which they are automatically logged in using SNo1, which is the initialized mobile ID can be separately displayed. The fact that a record is preserved for the game logged in and used using Hid may be notified. A list of the corresponding games may be displayed together with a message informing that record, friend, and item information on the respective games that are not logged in using the game integration ID will be deleted, and a message informing that information on the games that are logged in using the game integration ID will be preserved may be displayed.

That is, even though initialization is performed in any application of the mobile terminal, all applications in the mobile terminal may again start in a first flow. For example, an access initial screen or a log-in window may be provided or the fact that the log-in is performed using Hid may be displayed in the case of the application that has been logged in using the game integration ID (Hid).

After the initialization, when the second game is played, the fact that the second game is being logged in using Hid2 that has already been used for the log-in may be displayed. As the third game has also been logged in using Hid2, it may be similarly displayed. As SNo1, which is the mobile ID of the mobile terminal, has been initialized in a state in which the automatic log-in is performed using SNo1, the fourth game is no more automatically logged in using SNo1, but a new mobile ID (for example, SNo3) is created. That is, a new SNo of the mobile terminal is created and allocated. Therefore, when the first game is again played, it may be automatically logged in using the new created SNo3 and directly start.

Figure 13:
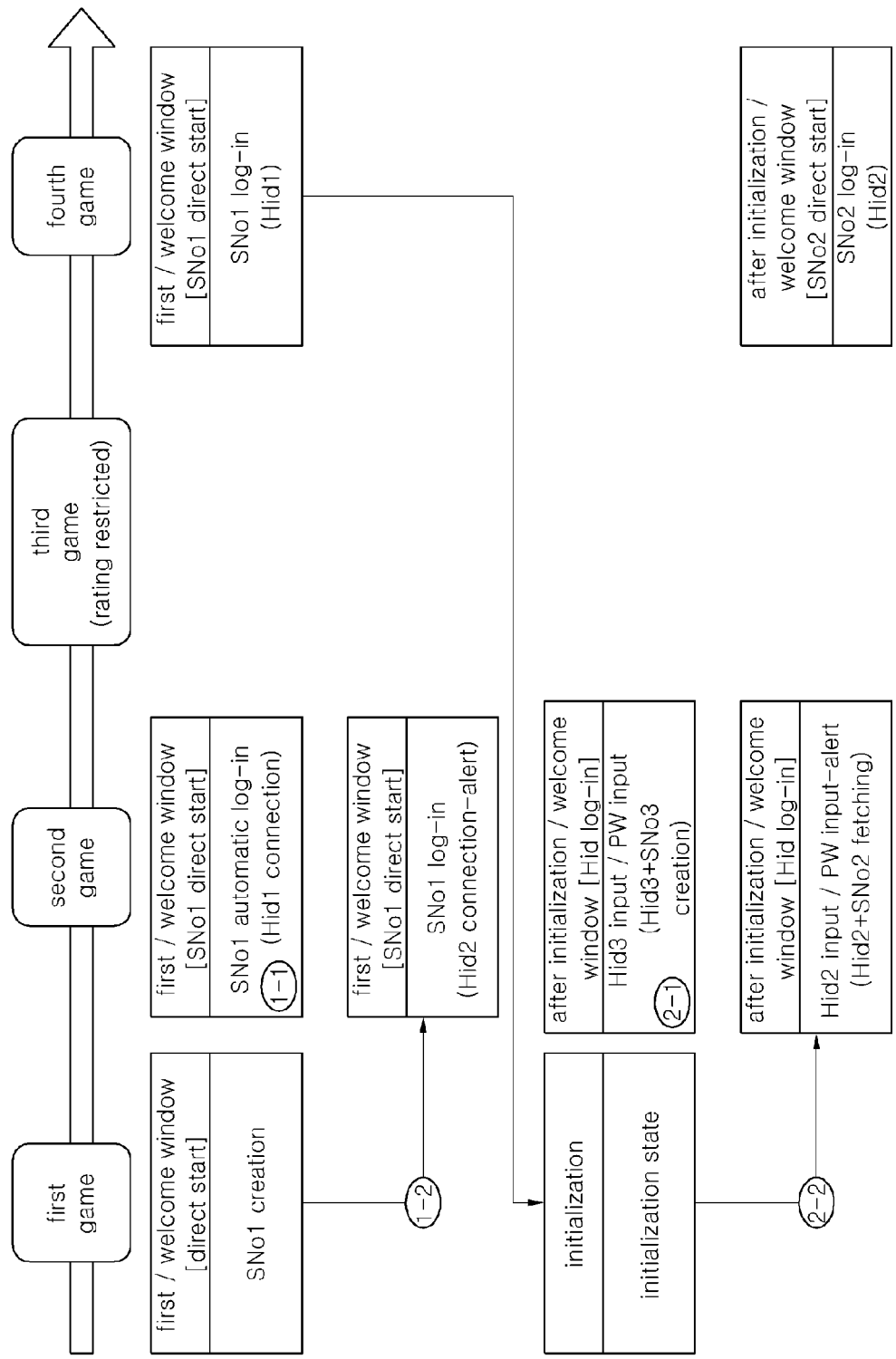
FIG. 13 illustrates a connection procedure of the game integration account applied to the real game according to exemplary embodiments of the present invention.

FIG. 13 illustrates a connection procedure of the game integration account applied to the real game according to exemplary embodiments of the present invention. Referring to FIG. 13, when the first game is first played, SNo1 is created and performs the automatic log-in as described above, such that the first game may be directly played without log-in. The play record for the game may be automatically stored in SNo1 without a separate log-in procedure as described above. According to exemplary embodiments of the present invention, the created SNo may be directly connected to other game integration IDs.

Next, when the second game is played, it is automatically logged in by SNo1 created due to the playing of the first game. 'Connection' is executed using Hid that is not mapped to SNo, thereby making it possible to interwork between the mobile ID and the game integration ID. According to exemplary embodiments of the present invention, in the case of performing the connection using the game integration ID already connected to another mobile ID, a message informing that the connection should be made using another ID may be displayed. For example, a message, such as, 'This ID is an ID to which another game record is connected. Please make a connection using another ID', or the like, may be displayed.

Next, when the fourth game is played, as SNo1 has been already allocated to the mobile terminal as described above to perform the automatic log-in, the fourth game may directly start in a state in which the automatic log-in is performed by SNo1.

When the mobile ID of the mobile terminal is initialized, the setting of the mobile terminal for SNo1 is released and initialized. When the second game is played after the initialization, the log-in may be performed using the game integration ID in a state in which the mobile ID of the mobile terminal is not present.

When the game integration ID performing the log-in is Hid3 and SNo connected to Hid3 is not present, SNo3, which is a new mobile ID, is created depending on the log-in of Hid3 and is one-to-one mapped to Hid3. On the other hand, when the game integration ID performing the log-in is Hid2 and SNo connected to Hid2 is present as SNo2, the mapped SNo2 is fetched depending on the log-in of Hid3. That is, the fetched SNo2 is set to SNo of the mobile terminal. When the fourth game is again played, it is logged in using SNo2 mapped to Hid2 and is played.

Figure 14:
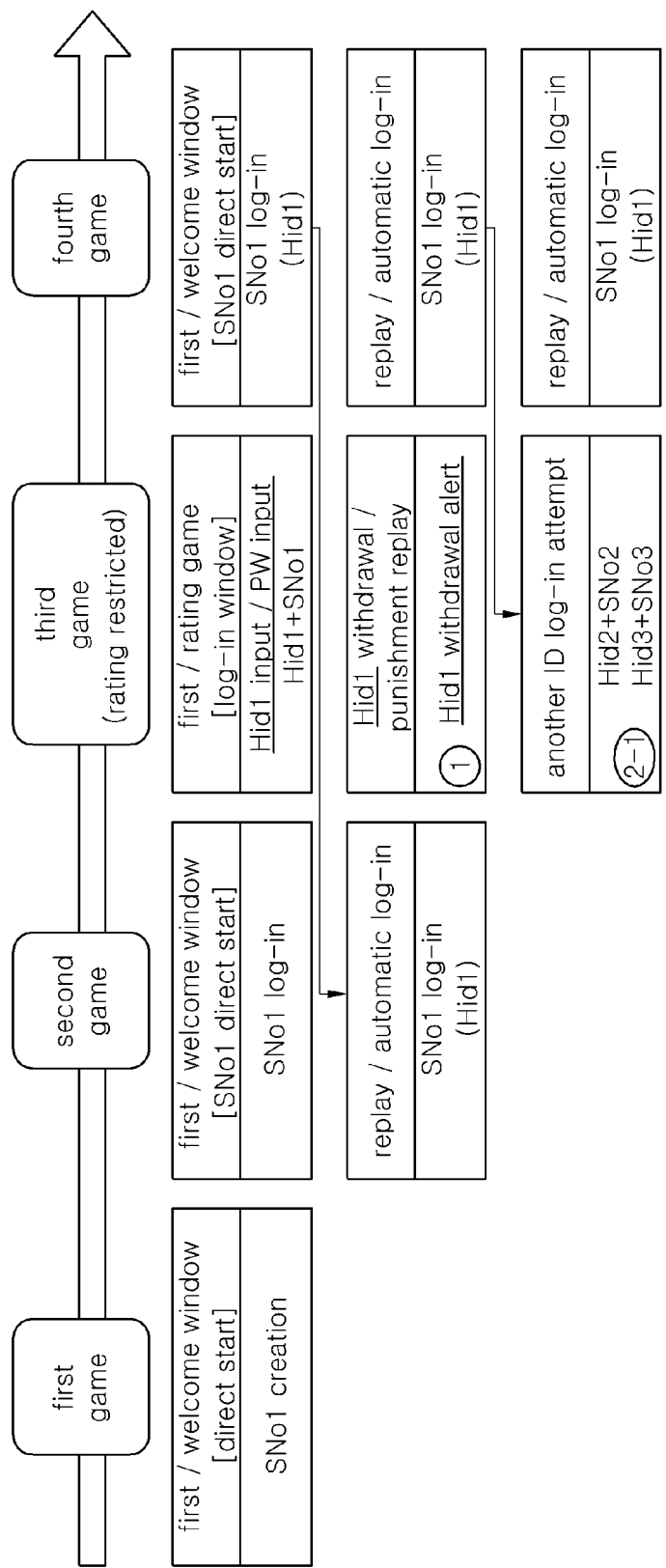
FIG. 14A and FIG. 14B illustrate a log-in procedure during withdrawal processing applied to the real game according to exemplary embodiments of the present invention.
Figure 14B:
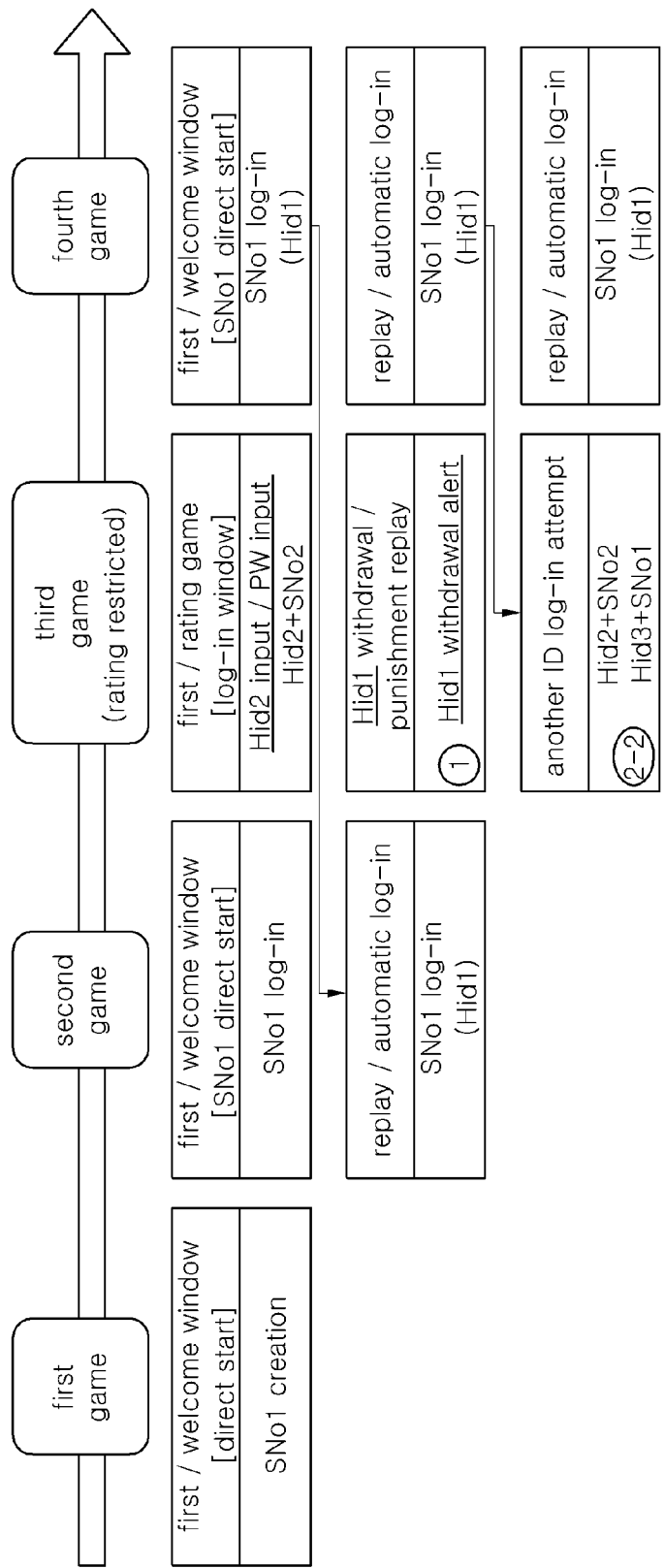

FIG. 14A and FIG. 14B illustrate a log-in procedure during withdrawal processing applied to the real game according to exemplary embodiments of the present invention. First, referring to FIG. 14A, when the first game is first played, SNo1 is created and performs the automatic log-in as described above, such that the first game may be directly played without log-in. The play record for the game may be automatically stored in SNo1 without a separate log-in procedure as described above. According to exemplary embodiments of the present invention, the created SNo may be directly connected to other game integration IDs.

Next, when the second game is played, it is automatically logged in by SNo1 created due to the playing of the first game. When the third game is played, as the third game is a game requiring authentication through separate log-in, it may be logged in and played using Hid1. Next, when the fourth game is played, as SNo1 has been already allocated to the mobile terminal as described above to perform the automatic log-in, the fourth game may directly start in a state in which the automatic log-in is performed by SNo1. Likewise, also when the second game is again played, it is automatically logged using SNo1.

When Hid1 is an account that is being withdrawn or punished, when the third game is again played, the fact that Hid1 is the account that is being withdrawn or punished may be informed and the fact that the log-in should be performed using another account may be notified. For example, a message, such as, 'Withdrawal is being requested. Please perform log-in using another ID' may be notified. When the notification message as described above is confirmed, a window capable of manually performing the log-in may be provided. Even though the fourth game is again played, SNo1 may be used for the automatic log-in before final withdrawal processing. For example, the game integration account Hid that is being withdrawal-processed (for example, a grace period of seven days) or is being punished is not subject to any processing, but may be considered as being in a normal state. Therefore, the mapping between Hid and SNo may not be released or deleted.

For example, the third game may be attempted to be logged in using another ID (for example, Hid2, Hid3, or the like), may be logged in Hid (for example, Hid2) connected to SNo of another mobile terminal, or may be logged in Hid (for example, Hid3) to which SNo is not yet connected. Therefore, when the third game is logged in using Hid connected to SNo of another mobile terminal as described above, accounts of Hid and SNo may be fetched and applied, and when the third game is logged in using Hid to which SNo is not yet connected, a new SNo (for example, SNo3) may be created and connected.

Next, referring to FIG. 14B, when the first game is first played, SNo1 is created and performs the automatic log-in as described above, such that the first game may be directly played without log-in. The play record for the game may be automatically stored in SNo1 without a separate log-in procedure as described above. According to exemplary embodiments of the present invention, the created SNo may be directly connected to other game integration IDs.

Next, when the second game is played, it is automatically logged in by SNo1 created due to the playing of the first game. When the third game is played, as the third game is a game requiring authentication through separate log-in, it may be logged in and played using Hid1. Next, when the fourth game is played, as SNo1 has been already allocated to the mobile terminal as described above to perform the automatic log-in, the fourth game may directly start in a state in which the automatic log-in is performed by SNo1. Likewise, also when the second game is again played, it is automatically logged using SNo1.

Next, when the third game is played, as the third game is the game requiring the authentication through a separate log-in, it may be logged in and played using Hid2. Next, when the fourth game is played, as SNo1 is in a state in which it is allocated to the current mobile terminal, the fourth game may be automatically logged in and played using SNo1 without separate log-in. Likewise, also when the second game is again played, it is automatically logged using SNo1.

When Hid2 is an account that is being withdrawn or punished, when the third game is again played, the fact that Hid2 is the account that is being withdrawn or punished may be informed and the fact that the log-in should be performed using another account may be notified. For example, a message, such as, 'Withdrawal is being requested. Please perform log-in using another ID' may be notified. When the notification message as described above is confirmed, a window capable of manually performing the log-in may be provided. When the fourth game is again played, it may be automatically logged and played using SNo1. The game integration account Hid that is being withdrawal-processed (for example, a grace period of seven days) or is being punished is not subject to any processing, but may be considered as being in a normal state. Therefore, the mapping between Hid and SNo may not be released or deleted.

For example, the third game may be attempted to be logged in using another ID (for example, Hid2, Hid3, or the like), may be logged in Hid connected to SNo of another mobile terminal, or may be logged in Hid to which SNo is not yet connected. Therefore, when the third game is logged in using Hid connected to SNo of another mobile terminal as described above, accounts of Hid and SNo may be fetched and applied, and when the third game is logged in using Hid to which SNo is not yet connected, SNo1 of the current corresponding mobile terminal may be connected to Hid used to perform the log-in.

Figure 15A:
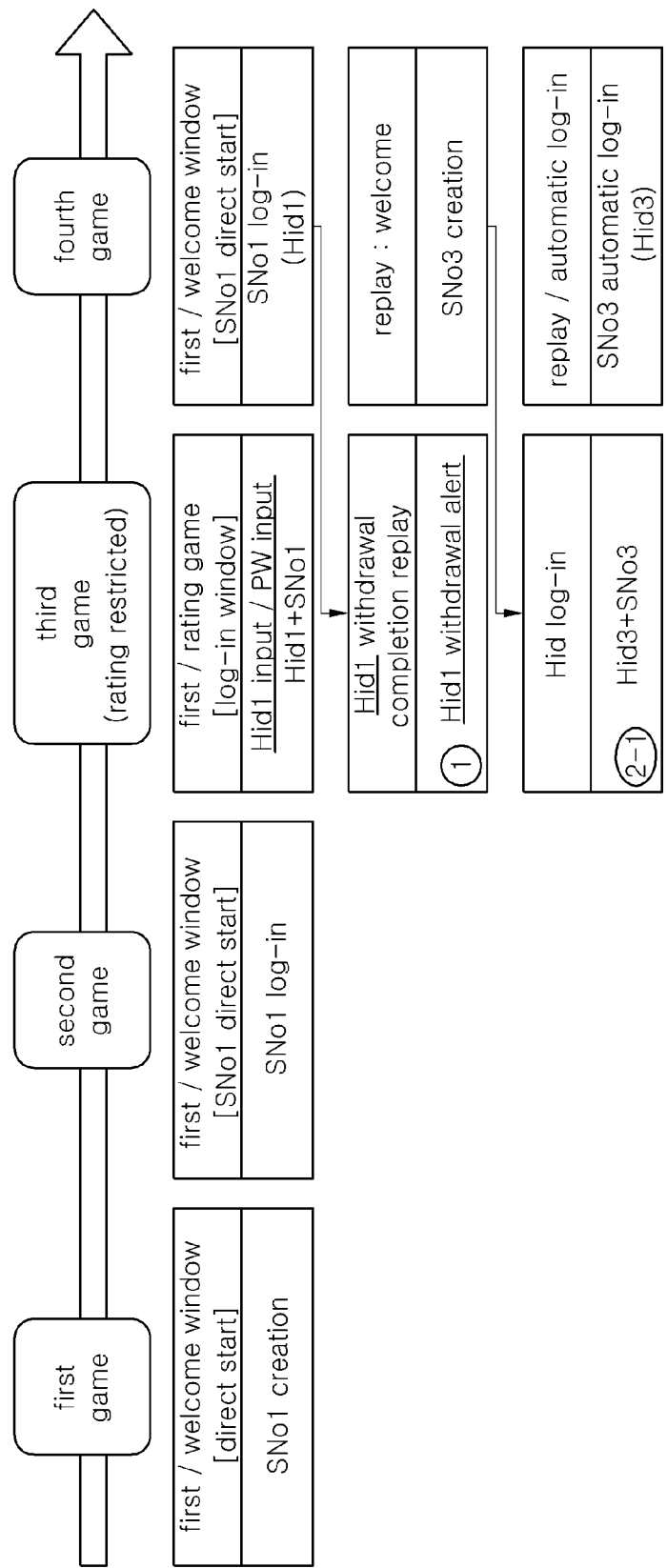
FIG. 15A and FIG. 15B illustrate a log-in procedure at the time of withdrawal completion applied to the real game according to exemplary embodiments of the present invention.
Figure 15B:
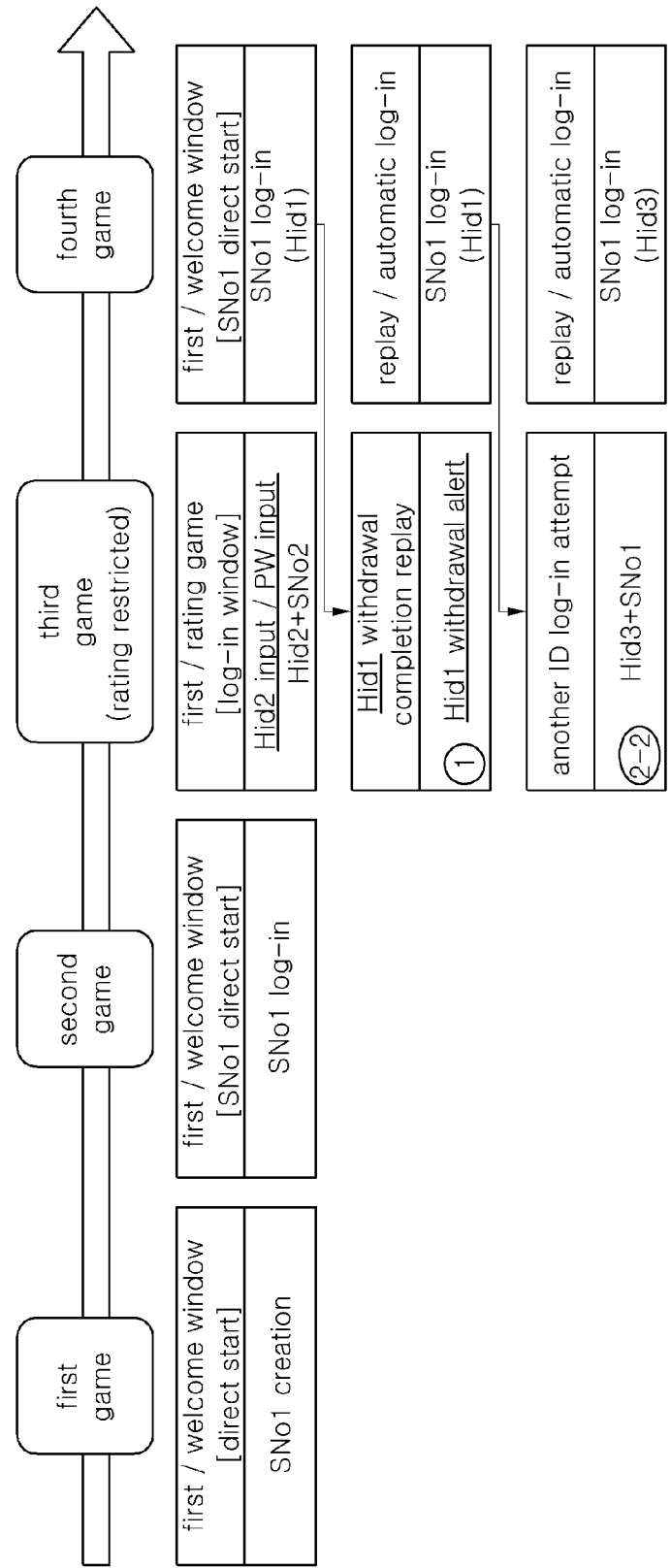

FIG. 15A and FIG. 15B illustrate a log-in procedure at the time of withdrawal completion applied to the real game according to exemplary embodiments of the present invention. When the withdrawal procedure is completed as described above with reference to FIG. 14A and FIG. 14B, the log-in procedure as shown in FIG. 15A and FIG. 15B may be applied.

First, referring to FIG. 15A, when the first game is first played, SNo1 is created and performs the automatic log-in as described above, such that the first game may be directly played without log-in. The play record for the game may be automatically stored in SNo1 without a separate log-in procedure as described above. According to exemplary embodiments of the present invention, the created SNo may be directly connected to other game integration IDs.

Next, when the second game is played, it is automatically logged in by SNo1 created due to the playing of the first game. When the third game is played, as the third game is a game requiring authentication through separate log-in, it may be logged in and played using Hid1. Next, when the fourth game is played, as SNo1 has been already allocated to the mobile terminal as described above to perform the automatic log-in, the fourth game may directly start in a state in which the automatic log-in is performed by SNo1. Likewise, also when the second game is again played, it is automatically logged using SNo1.

When Hid1 is an account from which withdrawal is completed, when the third game is again played, the fact that Hid1 is the account from which the withdrawal is completed may be informed and the fact that the log-in should be performed using another account may be notified. For example, a message, such as, 'An account that is not present, use another ID' may be notified. When the notification message as described above is confirmed, a window capable of manually performing the log-in is provided in the case of the rating restricted game, and a game first screen may be provided in the case of the game that may be used without log-in. When the fourth game is again played, as the fourth game may not be automatically logged in using SNo1 unlike FIG. 14A, a new SNo (that is, SNo3) is created and applied.

Next, the third game may be logged in using Hid3, which is another ID. Hid3 is one-to-one mapped to SNo3 as described above depending on the log-in. Next, when the fourth game is played, the fourth game is automatically logged in and played using SNo3, and the record is managed by Hid3 mapped to SNo3.

Next, referring to FIG. 15B, when the first game is first played, SNo1 is created and performs the automatic log-in as described above, such that the first game may be directly played without log-in. The play record for the game may be automatically stored in SNo1 without a separate log-in procedure as described above. According to exemplary embodiments of the present invention, the created SNo may be directly connected to other game integration IDs.

Next, when the second game is played, it is automatically logged in by SNo1 created due to the playing of the first game. When the third game is played, as the third game is a game requiring authentication through separate log-in, it may be logged in and played using Hid2. Next, when the fourth game is played, as SNo1 has been already allocated to the mobile terminal as described above to perform the automatic log-in, the fourth game may directly start in a state in which the automatic log-in is performed by SNo1. Likewise, also when the second game is again played, it is automatically logged using SNo1.

When Hid2 is an account from which withdrawal is completed, when the third game is again played, the fact that Hid2 is the account from which the withdrawal is completed may be informed. For example, a message, such as, 'An account that is not present, use another ID' may be notified. When the notification message as described above is confirmed, a window capable of manually performing the log-in is provided in the case of the rating restricted game, and a game first screen may be provided in the case of the game that may be used without log-in. When the fourth game is again played, it may be automatically logged and played using SNo1.

Next, the third game may be logged in using Hid3, which is another ID. Hid3 is one-to-one mapped to SNo1 as described above depending on the log-in. Next, when the fourth game is played, the fourth game is automatically logged in and played using SNo1, and the record is managed by Hid3 mapped to SNo1.

Hereinabove, the log-in procedures according to the exemplary embodiments of the present invention have been described with reference to FIG. 9, FIG. 10, FIG. 11, FIG. 12, FIG. 13, FIG. 14A, FIG. 14B, FIG. 15A and FIG. 15B. Next, examples in which a screen is displayed on the mobile terminal according to the respective log-in procedures will be described with reference to FIG. 16A, FIG. 16B, FIG. 17, FIG. 18, FIG. 19A, FIG. 19B, FIG. 19C, FIG. 19D, FIG. 19E, FIG. 20A, FIG. 20B, FIG. 20C, FIG. 20D and FIG. 20E.

Figure 16A:
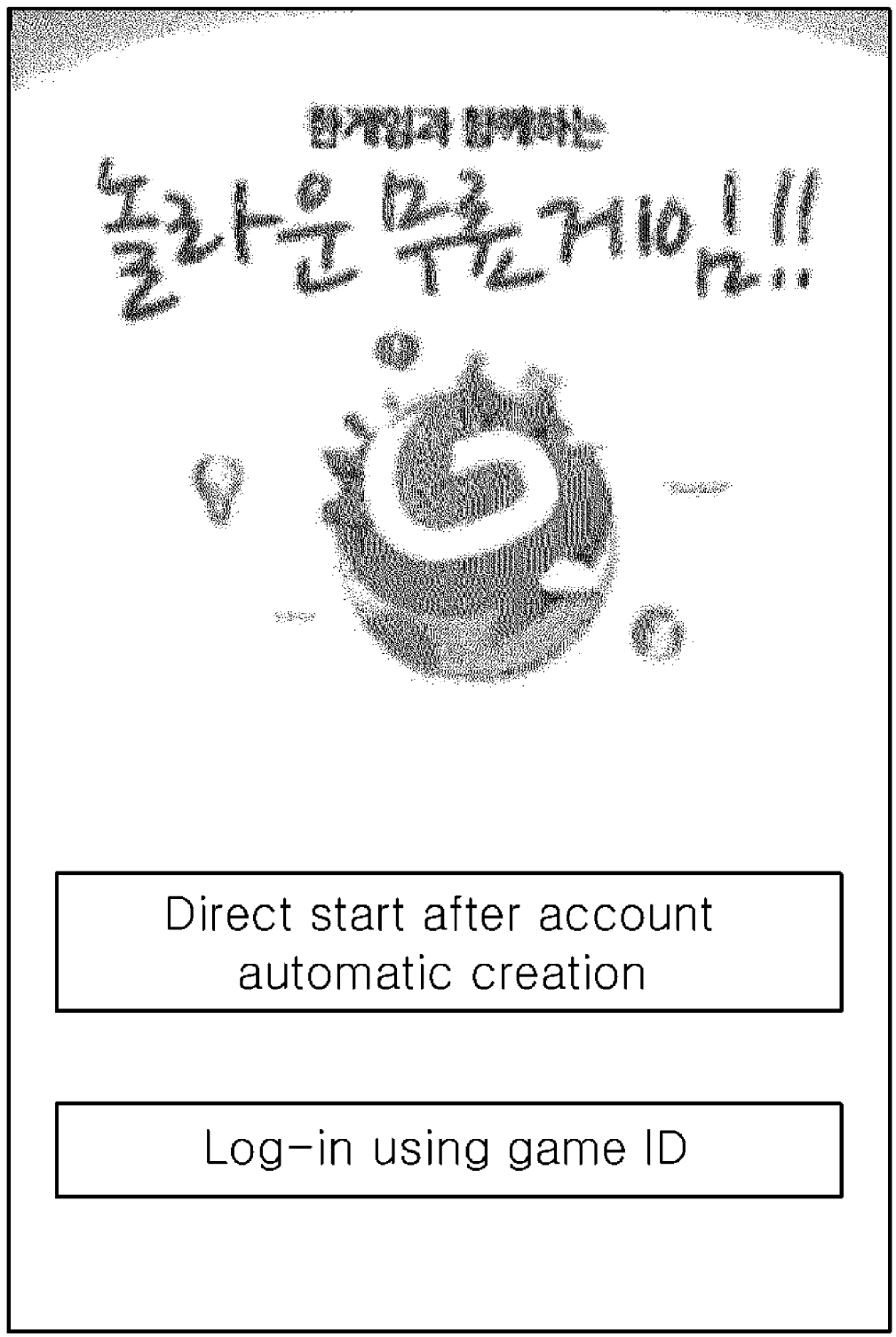
FIG. 16A illustrates a screen displayed at the time of first playing a game after initialization of the mobile terminal according to exemplary embodiments of the present invention.

FIG. 16A illustrates a screen displayed at the time of first playing a game after initialization of the mobile terminal according to exemplary embodiments of the present invention. Referring to FIG. 16A, in the case of first starting a specific game in the mobile terminal as described above, the corresponding game may be directly played while a game start screen (a welcome screen) as shown is displayed.

in the case of first playing a game having an integration account in the mobile terminal, only in the game that does not require separate authentication, a 'direct start after account automatic creation' or an item capable of performing 'log-in using a game integration ID' is provided as shown.

For example, when the 'direct start after account automatic creation' is selected, the mobile ID is automatically created and allocated to the mobile terminal according to exemplary embodiments of the present invention as described above. Then, the automatic log-in is performed using the mobile ID without a separate log-in procedure in the corresponding mobile terminal, such that the record may be managed.

On the other hand, when the 'log-in using a game ID' is selected, the game is logged in and played using the game integration account (that is, the game integration ID).

Figure 16B:
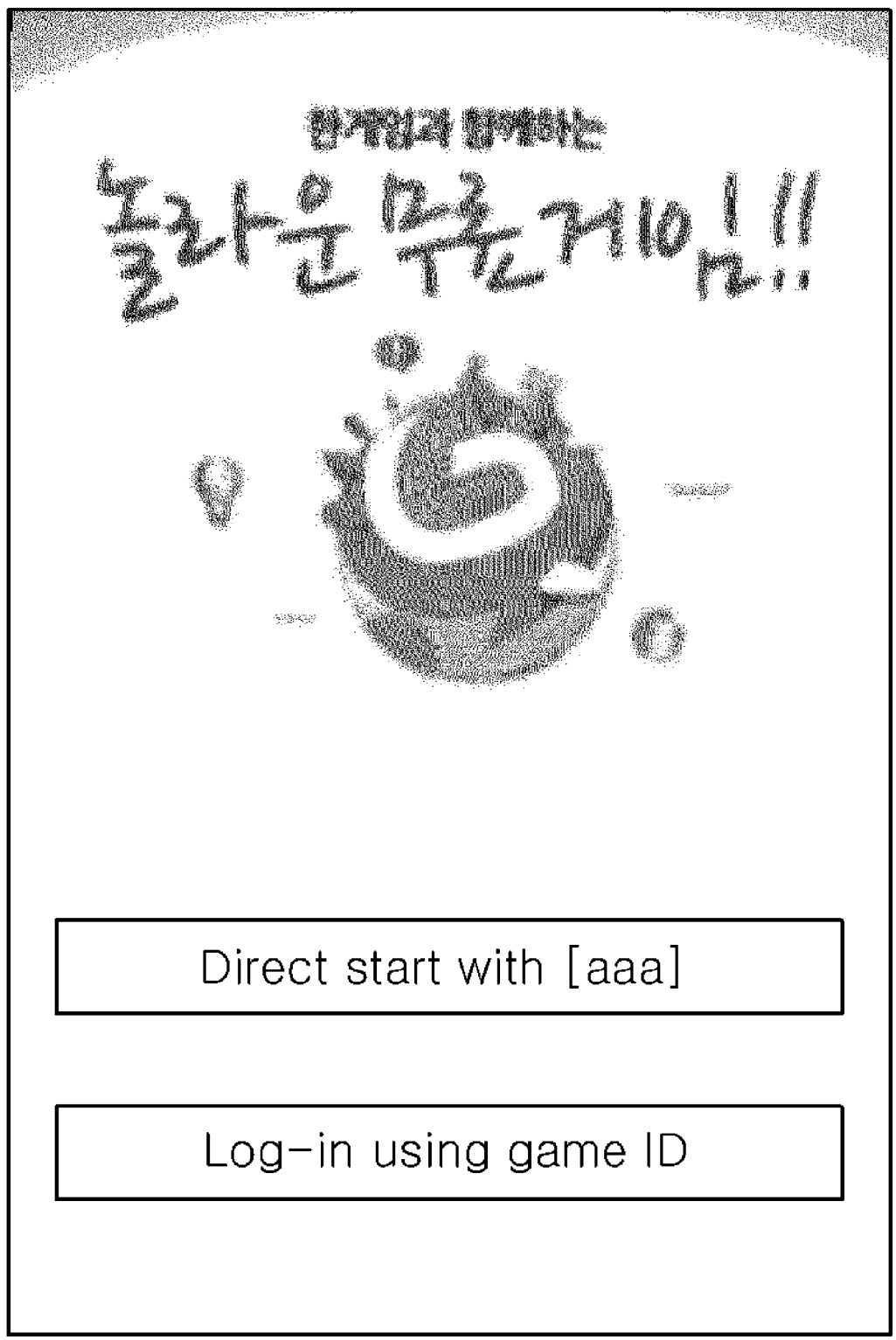
FIG. 16B illustrates a screen displayed at the time of log-out of an account of the mobile terminal in which the game integration account is connected according to exemplary embodiments of the present invention.

FIG. 16B illustrates a screen displayed at the time of log-out of an account of the mobile terminal in which the game integration account is connected according to exemplary embodiments of the present invention. Referring to FIG. 16B, once the mobile ID is created by executing an application for the specific game as shown in FIG. 16A, when another game is played, another game may be logged in and played using the created mobile ID or may be logged in and played using the game integration ID.

For example, when a 'direct start with [aaa]' is selected, the game is automatically logged and played using the created mobile ID according to exemplary embodiments of the present invention as described above.

On the other hand, when the 'log-in using a game ID' is selected, the game is logged in and played using the game integration account (that is, the game integration ID).

Figure 17:
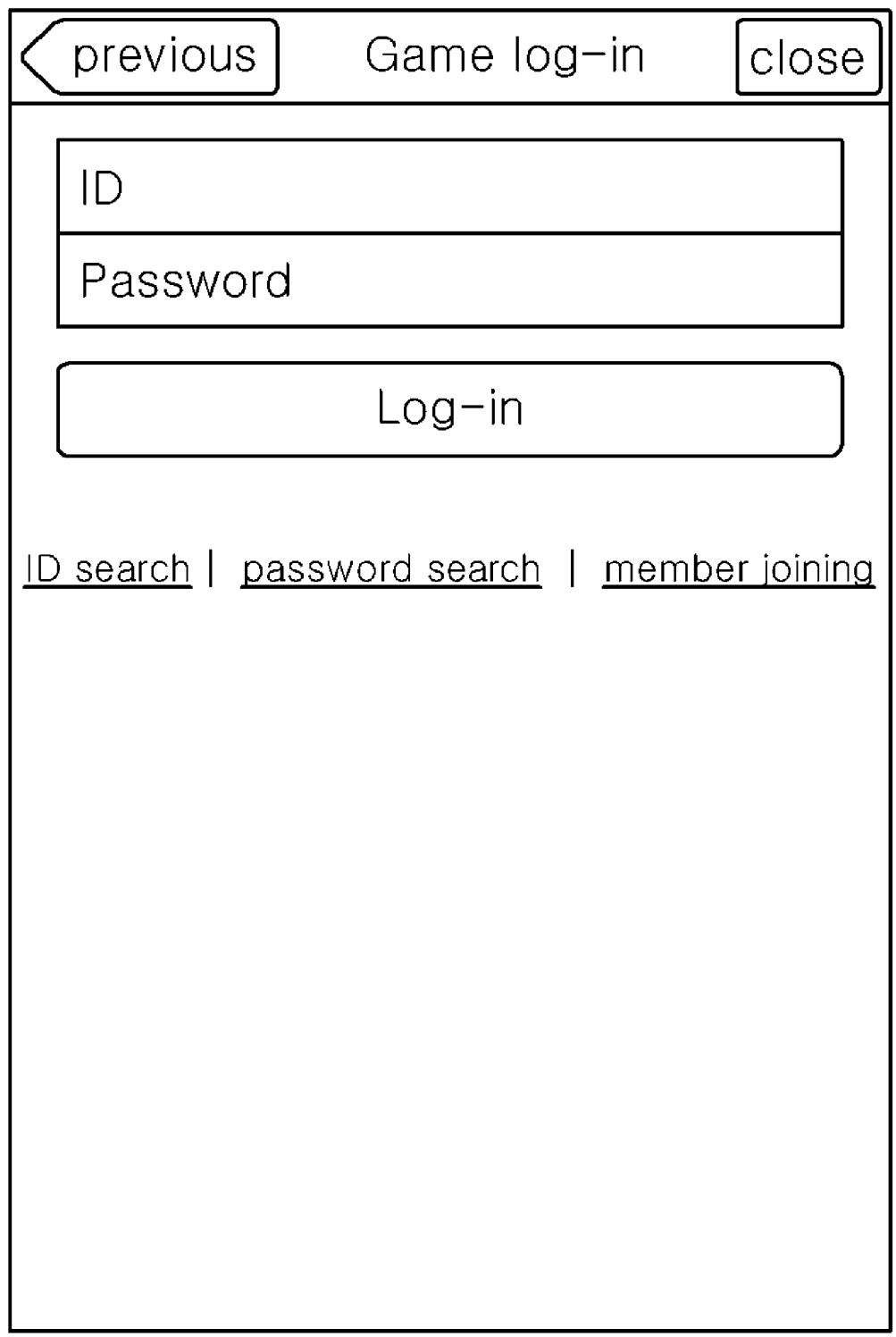
FIG. 17 illustrates a screen displayed at the time of log-in of the mobile terminal according to exemplary embodiments of the present invention.

FIG. 17 illustrates a screen displayed at the time of log-in of the mobile terminal according to exemplary embodiments of the present invention. Referring to FIG. 17, when the rating restricted game is first played, a log-in page as shown may be provided so that the log-in is performed using the game integration ID. Further, when log-in using a game integration account is selected in FIG. 16A or FIG. 16B, the log-in page as shown may be provided.

Further, when the account connection is executed as shown in FIG. 13 in a state in which the mobile terminal is not connected to the specific game integration ID, the log-in page as shown may be provided. Further, when the log-in for the rating restricted game is performed and the log-out from the rating restricted game is then performed, the log-in screen may be provided so that the log-in is again performed.

Figure 18:
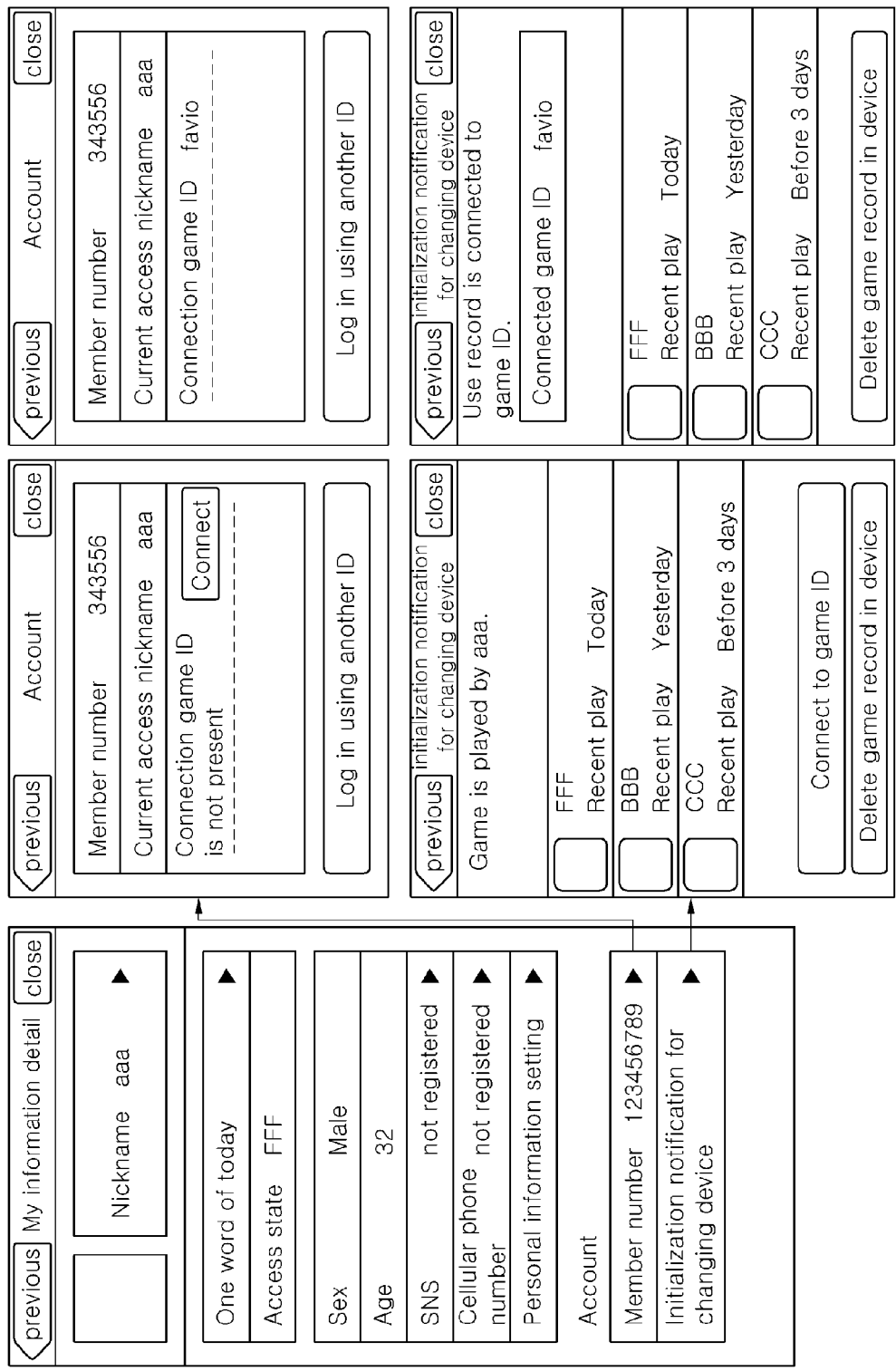
FIG. 18 illustrates a switching step of an account screen in the mobile terminal according to exemplary embodiments of the present invention.

FIG. 18 illustrates a switching step of an account screen in the mobile terminal according to exemplary embodiments of the present invention. Referring to FIG. 18, the mobile terminal may provide an account setting menu capable of setting or confirming the mobile terminal account or the game integration account according to exemplary embodiments of the present invention.

For example, when the user enters the account setting menu as shown, set or input contents, such as, a photograph, a nickname, an access state, a sex, an age, social network service information, cellular phone information, personal information setting, and the like, of the user may be displayed.

When a member number is selected in an account item, an account situation for the corresponding member number may be displayed. For example, when the mobile ID is set to the member number '343556', when the corresponding account is confirmed, whether the game integration account connected to the nickname is present may be provided. When the connected game integration account is present with respective to the account, it may be displayed by a 'connected game ID: aaa', or the like, as shown. Therefore, when log-in using another ID is selected, the log-in may be performed and progress using another game integration account.

When initialization notification for changing a device is selected, the game record in the device may be deleted, and information on the mobile ID allocated as described above may be deleted.

When the corresponding account (that is, the mobile ID) is not connected to the specific game integration account as shown, a menu capable of connecting the corresponding account to the game integration account may be provided. When the corresponding account (that is, the mobile ID) is connected to the specific game integration account, information on the corresponding game integration account may be provided.

FIG. 19A, FIG. 19B, FIG. 19C, FIG. 19D, and FIG. 19E illustrate a switching step of an account screen when the game integration account is not connected in the mobile terminal according to exemplary embodiments of the present invention.

Figure 19A:
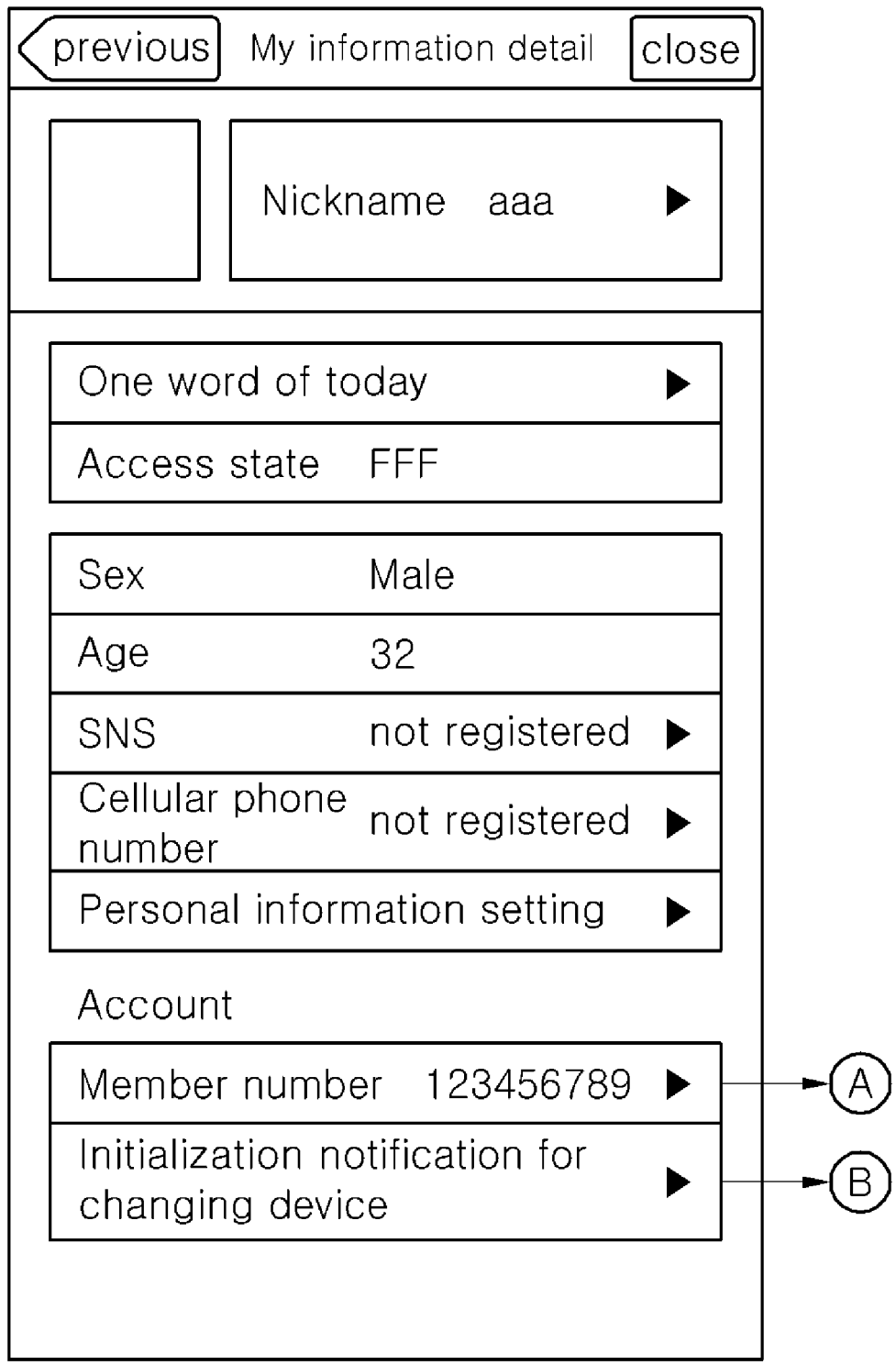
FIG. 19A, FIG. 19B, FIG. 19C, FIG. 19D, and FIG. 19E illustrate a switching step of an account screen when the game integration account is not connected in the mobile terminal according to exemplary embodiments of the present invention.

Referring to FIG. 19A, an account screen as shown in FIG. 18 may be provided. When the member number is selected, the account screen may be switched into an account screen as shown in FIG. 19B, and when the initialization notification for changing a device is selected, the account screen may be switched into an account screen as shown in FIG. 19C.

Figure 19B:
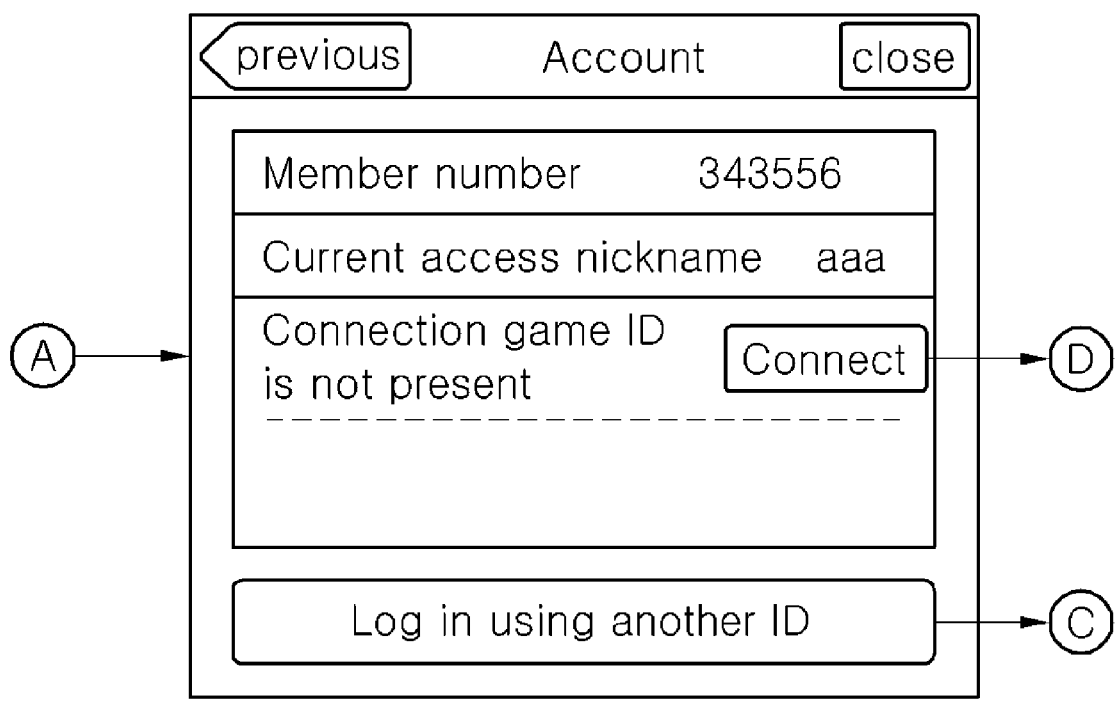

Referring to FIG. 19B, when the specific account (that is, the mobile ID) is selected in FIG. 19A, information on the mobile account set in the corresponding mobile terminal is displayed. When the currently connected game integration account is not present, when a 'connection' is selected, a log-in screen as shown in FIG. 19E is provided and the log-in is performed using the corresponding game integration account, such that the game integration account used for the log-in and the mobile account are one-to-one mapped to each other.

Figure 19C:
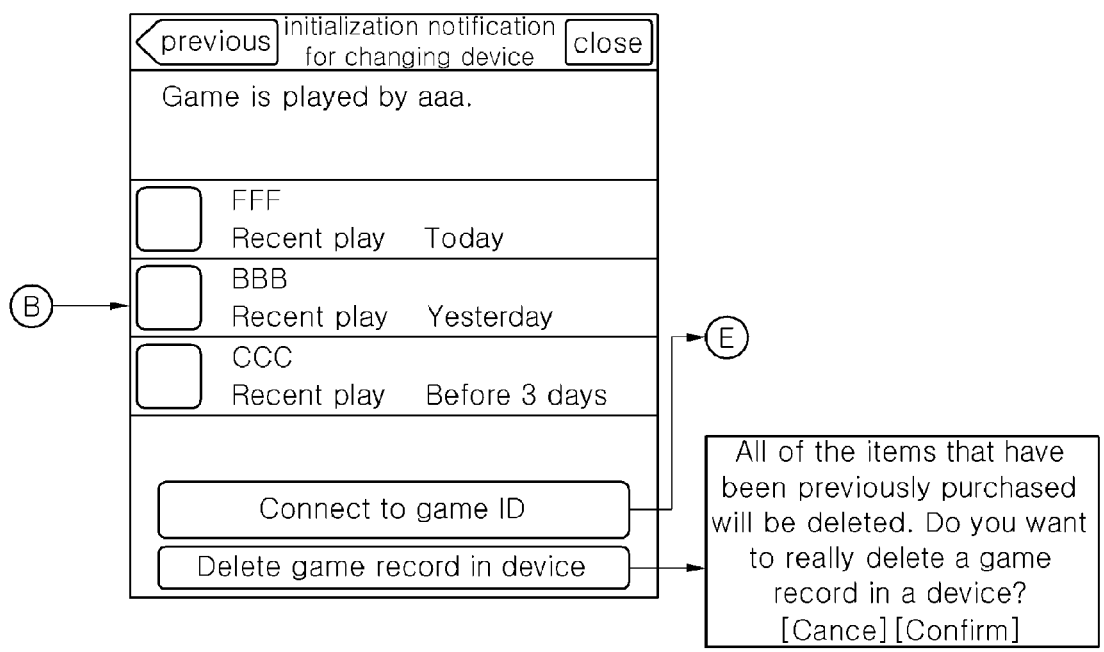
Figure 19D:
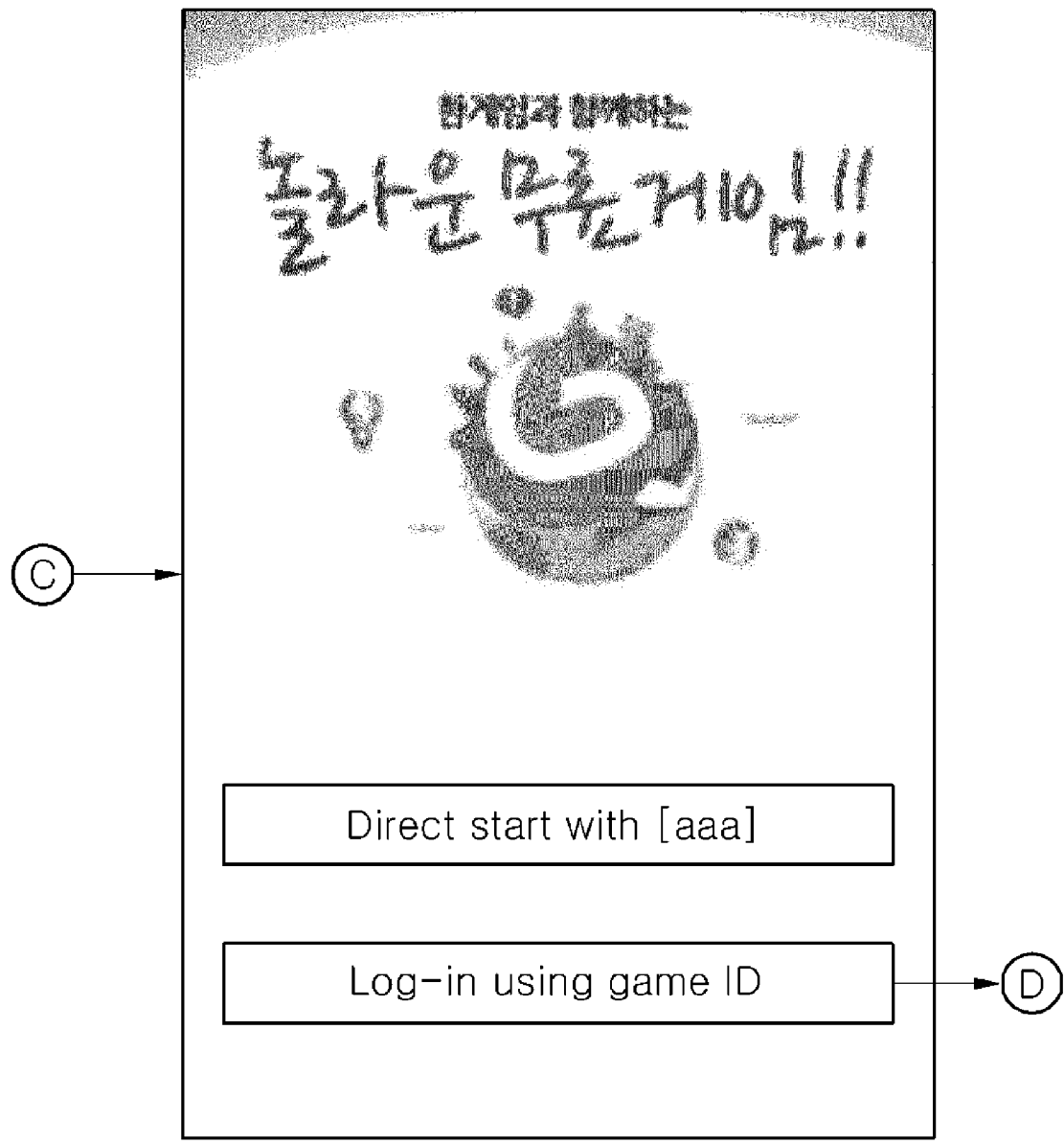

When the log-in using another ID is selected in FIG. 19B, the account screen may be switched into a game initial start screen as shown in FIG. 19D.

Referring to FIG. 19C, the 'initialization for changing a device' is selected in FIG. 19A, such that an initialization menu for changing a device is provided. That is, the created mobile ID may also be initialized.

Figure 19E:
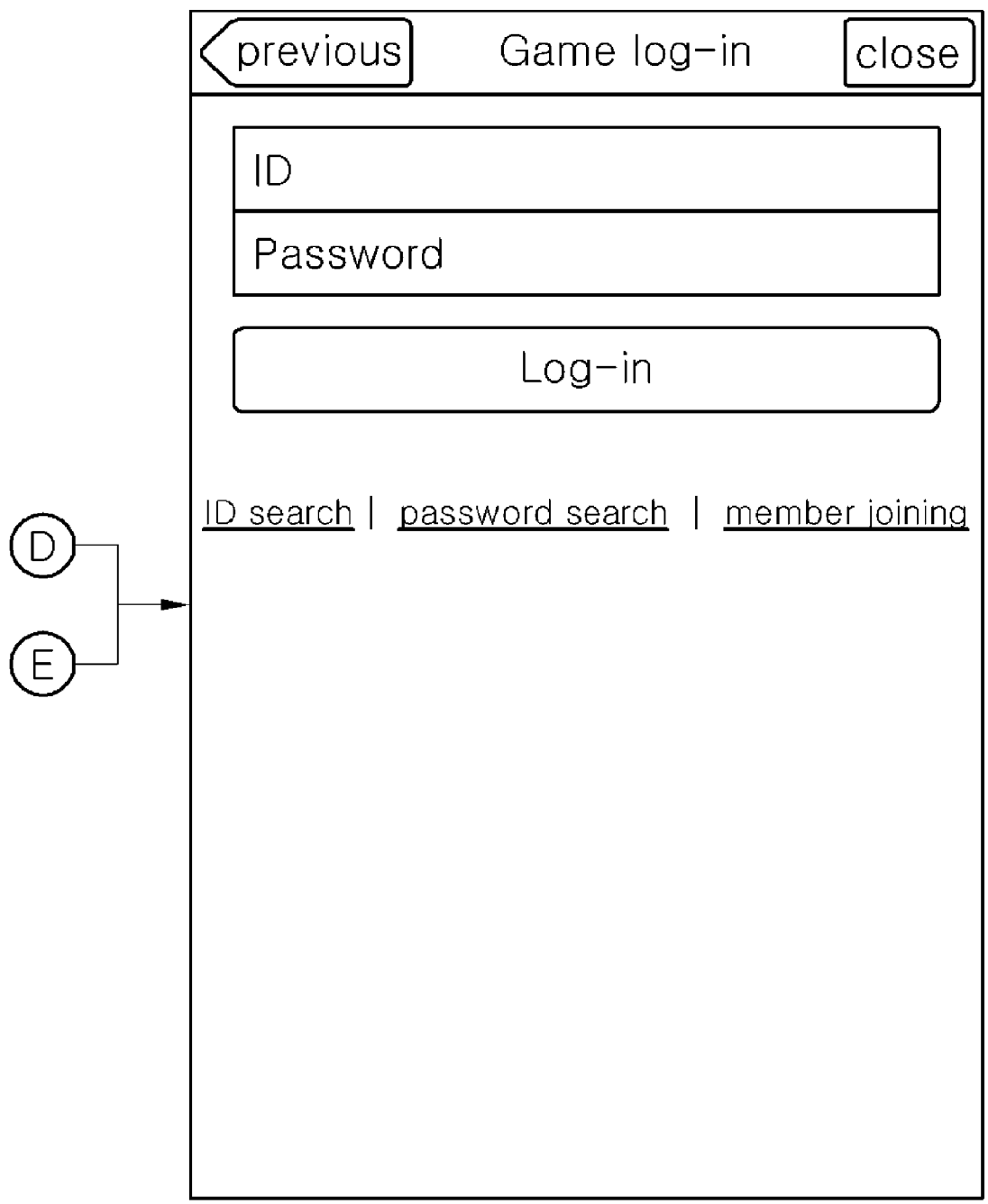

When the connection to the game integration account is selected in FIG. 19C, a log-in screen for the game integration account of FIG. 19E is provided. When a 'deletion of a game record in a device' is selected in FIG. 19C, the device initialization for the mobile ID is performed. A notification window, such as, 'All of the items that have been previously purchased will be deleted. Do you want to really delete a game record in a device?' before device initialization to perform re-confirmation for the account deletion can be created.

FIG. 19D shows a screen, that is, a game initial start screen, provided when the log-in using another ID is selected in FIG. 19B. When 'log-in using a game ID' is selected in FIG. 19D, a log-in screen for the game integration account as shown in FIG. 19E is provided.

FIG. 19E illustrates the log-in screen for the game integration account as described above, an ID and a password are input to perform the log-in using a specific game integration account. The game integration account includes an account already created in a game integration portal through a personal computer (PC), or the like.

FIG. 20A, FIG. 20B, FIG. 20C, FIG. 20D and FIG. 20E illustrate a switching step of an account screen when the game integration account is connected in the mobile terminal according to exemplary embodiments of the present invention.

Figure 20A:
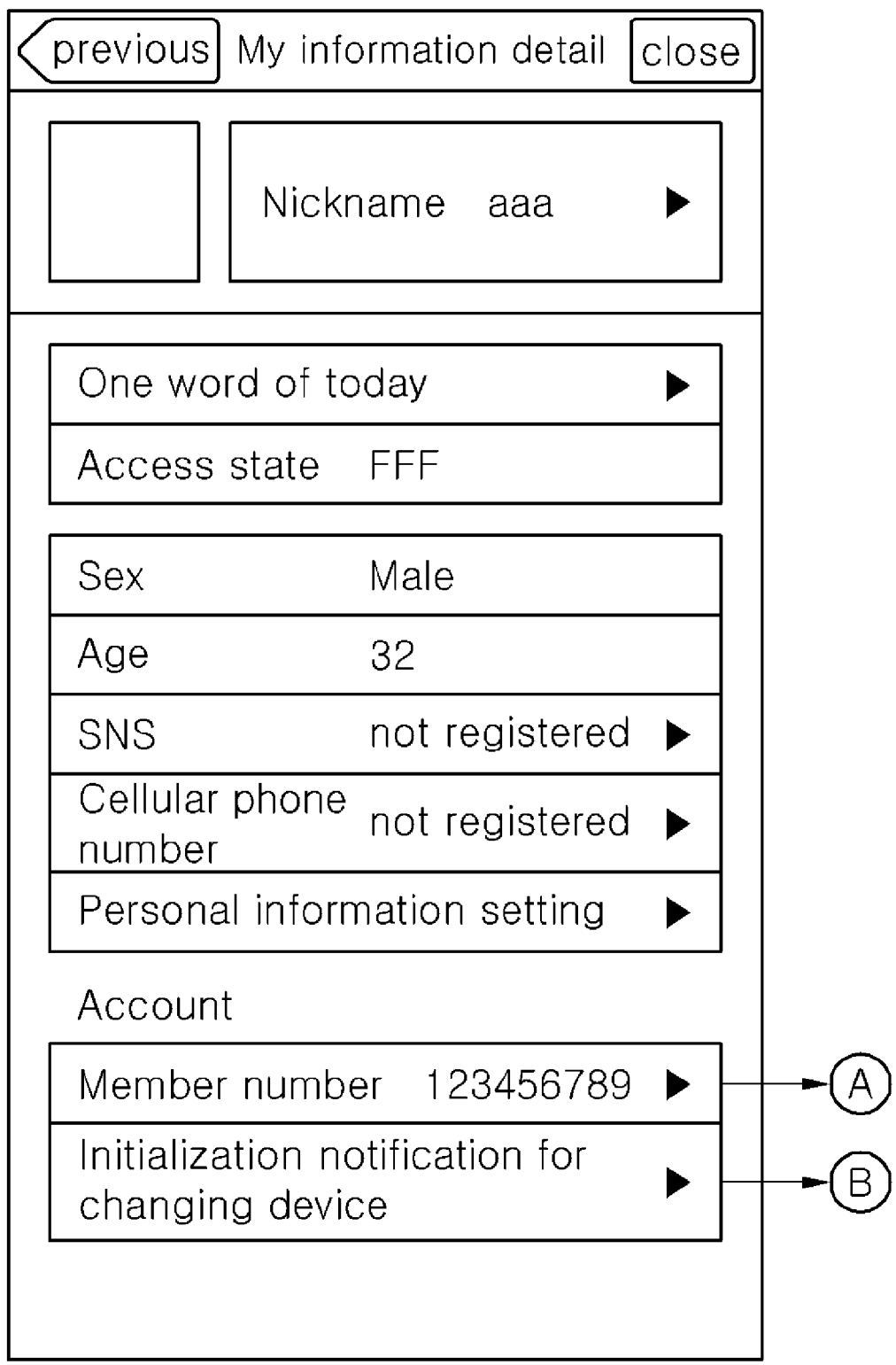
FIG. 20A, FIG. 20B, FIG. 20C, FIG. 20D and FIG. 20E illustrate a switching step of an account screen when the game integration account is connected in the mobile terminal according to exemplary embodiments of the present invention.
Figure 20B:
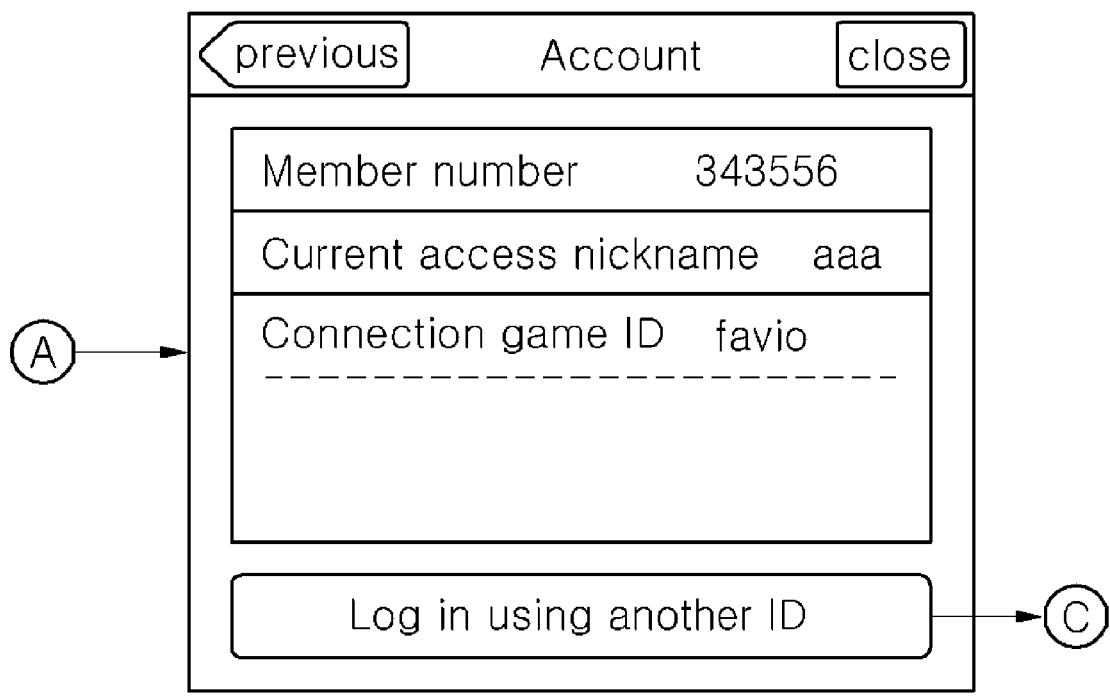
Figure 20C:
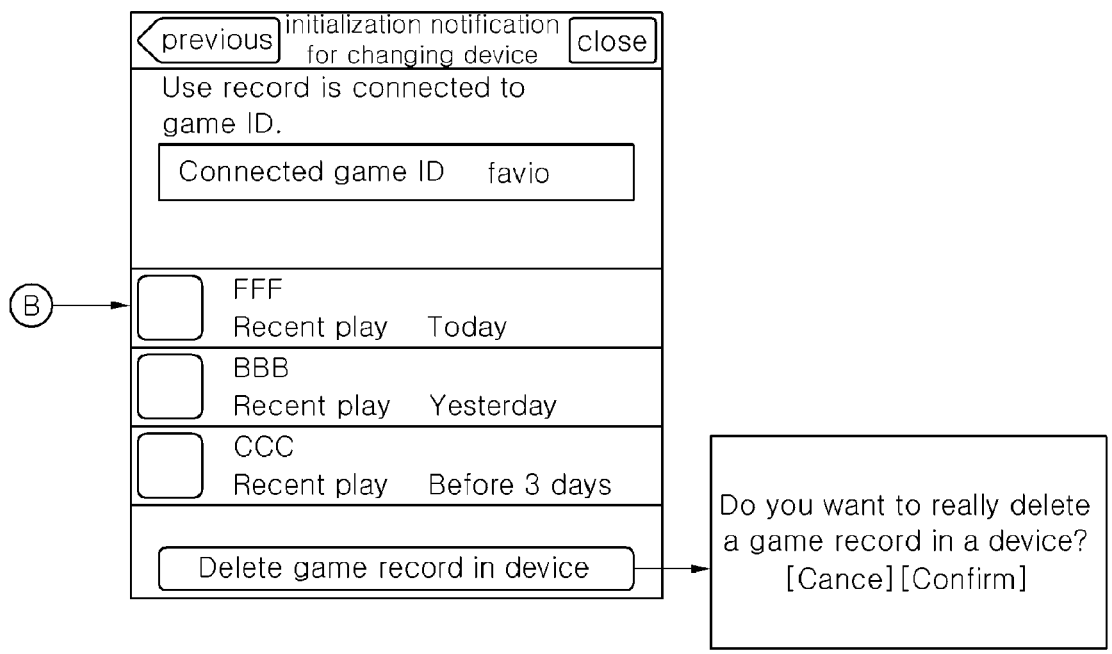

Referring to FIG. 20A, an account screen as shown in FIG. 18 may be provided. when the member number is selected, the account screen may be switched into an account screen as shown in FIG. 20B, and when the initialization notification for changing a device is selected, the account screen may be switched into an account screen as shown in FIG. 20C.

Referring to FIG. 20B, when the specific account (that is, the mobile ID) is selected in FIG. 20A, information on the mobile account set in the corresponding mobile terminal is displayed. When the currently connected game integration account is present unlike FIG. 19, information on the corresponding game integration account may be provided. When the 'log-in using another ID' is selected in the screen, a log-in screen as shown in FIG. 20D may be provided, and the log-in may be performed using another game integration account.

Referring to FIG. 20C, the 'initialization for changing a device' is selected in FIG. 20A, such that an initialization menu for changing a device is provided. That is, the created mobile ID may also be initialized.

When a 'deletion of a game record in a device' is selected in FIG. 20C, the device initialization for the mobile ID is performed. A notification window, such as, 'Do you want to really delete a game record in a device?' before device initialization to perform re-confirmation for the account deletion can be created.

Figure 20D:
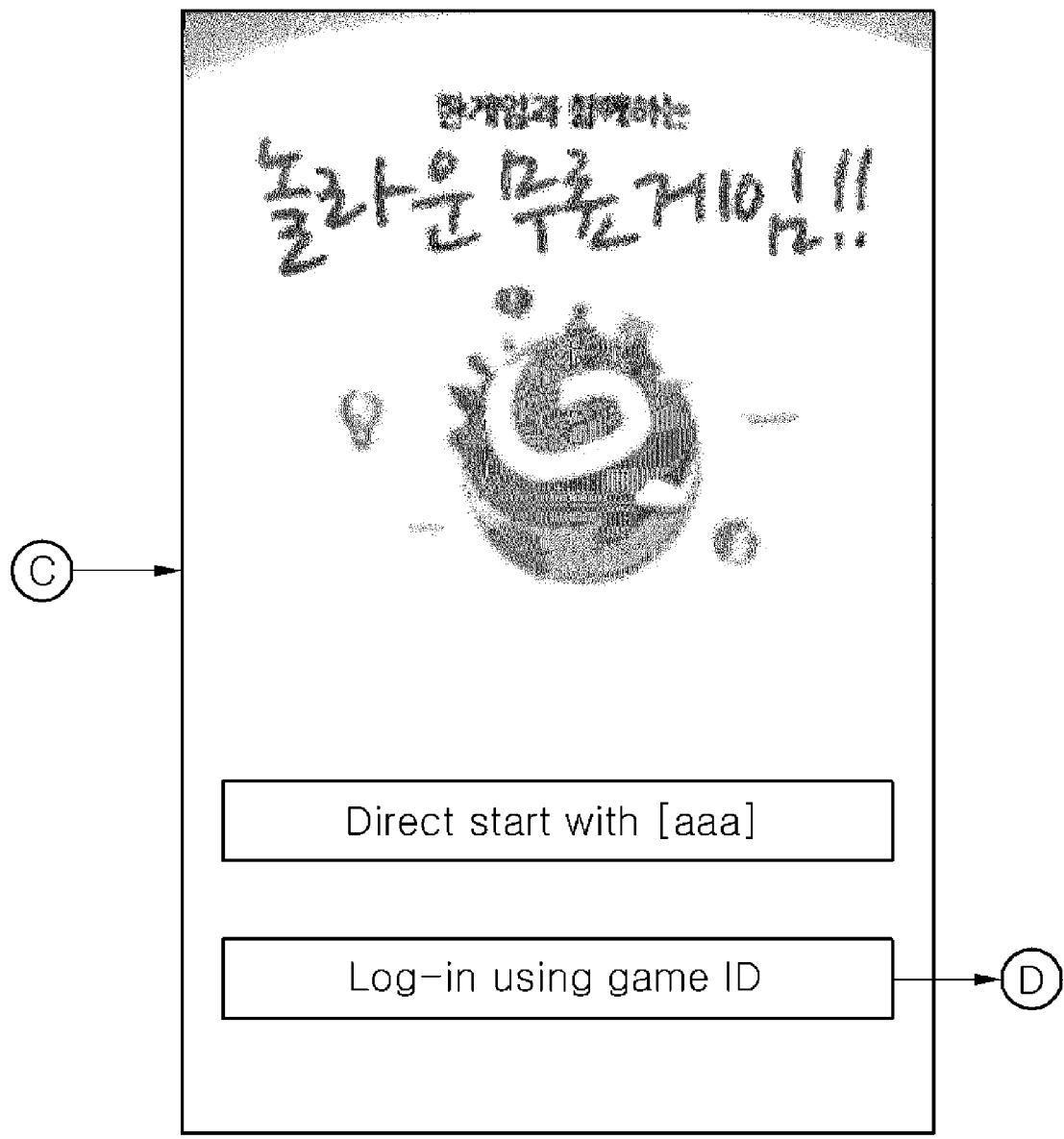

FIG. 20D shows a screen, that is, a game initial start screen, provided when the log-in using another ID is selected in FIG. 20B. When 'log-in using a game ID' is selected in FIG. 20D, a log-in screen for the game integration account as shown in FIG. 20E is provided.

Figure 20E:
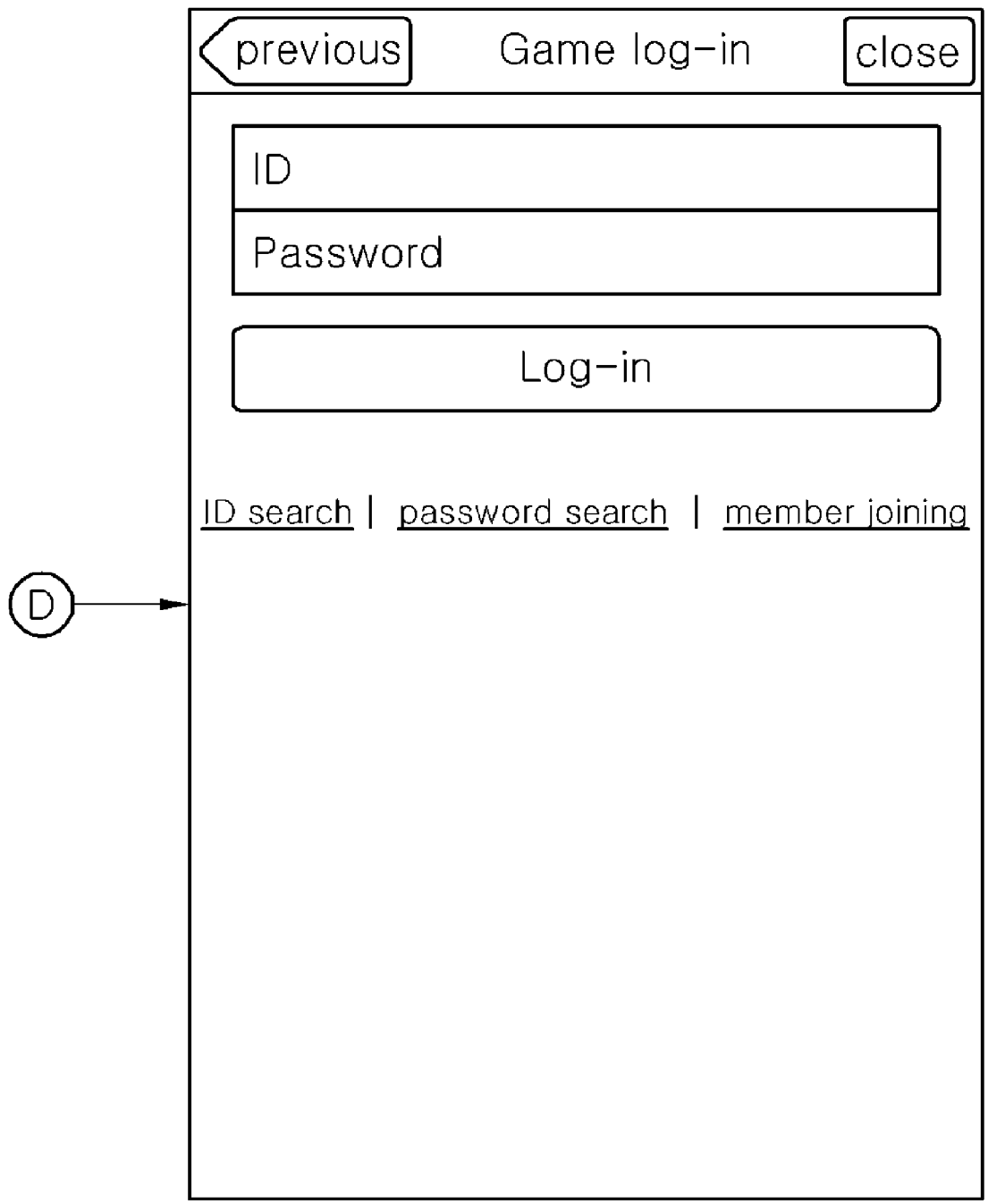

FIG. 20E illustrates the log-in screen for the game integration account as described above, an ID and a password are input to perform the log-in using a specific game integration account. The game integration account includes an account already created in a game integration portal through a personal computer (PC), or the like.

Hereinabove, although the present invention is described by specific matters, such as, concrete components, and the like, exemplary embodiments, and drawings, they are provided only for assisting in the entire understanding of the present invention. Therefore, the present invention is not limited to exemplary embodiments. Various modifications and changes may be made by those skilled in the art to which the present invention pertains from this description.

Therefore, the spirit of the present invention should not be limited to the above-described exemplary embodiments and the following claims as well as all modified equally or equivalently to the claims are intended to fall within the scope and spirit of the invention.

What is claimed is:

1. An apparatus comprising:
   a game integration identification (ID) information database configured to store information on a game integration ID that manages games on a storage device;
   a mobile ID confirming unit comprised in a log-in server, configured to receive, from a mobile terminal, unique terminal identification information of the mobile terminal and configured to confirm, with a profile server, whether a mobile ID is mapped to the terminal identification information based on information of the mobile ID received from a mobile ID information database;
   a mobile ID creating unit comprised in the profile server, configured to create a new mobile ID mapped to the terminal identification information when the mobile ID confirming unit confirms that the mobile ID is not mapped to the terminal identification information; and
   a game ID mapping unit comprised in the profile server, configured to create a one-to-one mapping between the created mobile ID and the game integration ID,
   wherein:
   information comprising state of play of a played game is stored in both a game integration ID associated with the played game and a mobile ID mapped to the game integration ID; and
   the apparatus is configured to resume the played game at the stored state of play according to either the game integration ID or the mobile ID mapped thereto on one of the mobile terminal and a second mobile terminal.

2. The apparatus of claim 1, further comprising a log-in processing unit comprised in the log-in server, configured to receive, from the mobile terminal, a log-in request comprising a game integration ID from pre-registered game integration IDs, and configured to log-in a user using the game integration ID through authentication based on the log-in request,
   wherein after the log-in by the log-in processing unit, when the game integration ID comprised in the log-in request is not mapped to the created mobile ID, the game ID mapping unit is configured to store a one-to-one mapping of the created mobile ID and the game integration ID comprised in the log-in request.

3. The apparatus of claim 1,
   wherein when a game is played in the mobile terminal or the second mobile terminal, the apparatus is further configured to automatically log-in the mobile terminal using the created mobile ID, configured to receive information on the played game from the mobile terminal, and configured to map the information on the played game to the created mobile ID.

4. The apparatus of claim 1, further comprising:
   an ID mapping information database configured to store the mapping between the mobile ID and game integration ID; and
   a log-in processing unit comprised in the log-in server, configured to receive, from the mobile terminal, a log-in request comprising a game integration ID from pre-registered game integration IDs, configured to log-in a user using the game integration ID through authentication, and configured to transmit information on the mapped mobile ID from the ID mapping information database to the mobile terminal when a mobile ID mapped to the game integration ID used for the log-in is present in the ID mapping information database.

5. The apparatus of claim 1, further comprising an initialization processing unit configured to receive an initialization request for the created mobile ID from the mobile terminal and configured to release a connection between the mobile ID and terminal identification information based on the initialization request.

6. A method comprising:
storing information, on a storage device, on a game integration ID used to manage games;
receiving, by a mobile ID confirming unit comprised in a log-in server, unique terminal identification information of a mobile terminal from the mobile terminal;
confirming, by the mobile ID confirming unit comprised in the log-in server, whether a mobile ID is mapped to the terminal identification information;
creating, by a mobile ID creating unit comprised in a profile server, a mobile ID mapped to the terminal identification information when the confirming determines that a mobile ID is not mapped to the terminal identification information; and
mapping, one-to-one, by a game ID mapping unit comprised in the profile server, the created mobile ID and the game integration ID,
wherein information comprising state of play of a played game is stored in both a game integration ID associated with the played game and a mobile ID mapped to the game integration ID such that the played game is resumed at the stored state of play according to either the game integration ID or the mobile ID mapped thereto on one of the mobile terminal and a second mobile terminal.

7. The method of claim 6, wherein a plurality of game integration IDs are created for the gaming account.

8. The method of claim 6, wherein the terminal identification information comprises one or more of a terminal serial number, a network medium access control (MAC) information, and an ID information of an operating system.

9. The method of claim 6, further comprising:
receiving information on a log-in request using a game integration ID from pre-registered game integration IDs from the mobile terminal;
performing log-in processing using the game integration ID through authentication based on the log-in request; and
mapping, one-to-one, the mobile ID and the game integration ID comprised in the log-in request, when the game integration ID comprised in the log-in request is not mapped to the created mobile ID after the performing of the log-in.

10. The method of claim 6, further comprising performing an automatic log-in using the created mobile ID wherein when a game is played in the mobile terminal, wherein information on the played game is received from the mobile device, mapped to the mobile ID, and stored.

11. The method of claim 10, further comprising switching a screen on the mobile terminal into a log-in page for the game integration ID based on a play request for the game when the played game requires authentication through log-in.

12. The method of claim 10, wherein the performing the automatic log-in is performed using the crearted mobile ID for playing of a first game in the mobile terminal and automatic log-in is performed using the mobile ID without a separate log-in procedure when a second game different from the first game is played.

13. The method of claim 6, further comprising:
receiving, from the mobile terminal, a log-in request using a game integration ID from pre-registered game integration IDs ;
performing log-in processing using the game integration ID through authentication based on the log-in request; and
transmitting information on the mapped mobile ID from an ID mapping information database to the mobile terminal when a mobile ID mapped to the game integration ID used for the log-in is present after the log-in processing.

14. The method of claim 6, further comprising releasing a connection between the mobile ID and terminal identification information corresponding to the mobile ID, when an initialization request for the created mobile ID is received from the mobile terminal.

15. The method of claim 14, wherein after the releasing, the mapping between the game integration ID and the mobile ID is maintained.

16. The method of claim 15, wherein after the releasing, when log-in is performed using a game integration ID mapped to the mobile ID whose connection has been released in the mobile terminal, the game is played based on a game record of the game integration ID used for the log-in.

17. The method of claim 14, wherein after the releasing, in the case in which a game is played in the mobile terminal, a new mobile ID different from the created mobile ID, for which the initialization is requested, is created.

18. The method of claim 6, further comprising withdrawing the created mobile ID, wherein the mapping between the mobile ID and the game integration ID is maintained until the withdrawing is completed.

19. The method of claim 6, further comprising:
receiving a log-in request using a second game integration ID mapped to a second mobile ID allocated to a second mobile terminal, wherein the second game integration ID is from pre-registered game integration IDs from a first mobile terminal having a first mobile ID;
performing log-in processing using the second game integration ID through authentication based on the log-in request;
transmitting game information of the second game integration ID from an ID mapping information database to the first mobile terminal after the log-in processing; and
allowing the game to be played based on a game record of the second game integration ID in the first mobile terminal by the transmitted game information of the second game integration ID.

20. A non-transitory computer readable medium comprising an executable program which, when executed, performs a method comprising:
storing information, on a storage device, on a game integration ID used to manage games;
receiving, by a mobile ID confirming unit comprised in a log-in server, unique terminal identification information of a mobile terminal from the mobile terminal;
confirming, by the mobile ID confirming unit comprised in a profile server, whether a mobile ID is mapped to the terminal identification information;
creating, by a mobile ID creating unit comprised in the profile server, a mobile ID mapped to the terminal identification information when the confirming determines that a mobile ID is not mapped to the terminal identification information; and
mapping, one-to-one, the created mobile ID and the game integration ID, wherein information comprising state of play of a played game is stored in both a game integration ID associated with the played game and a mobile ID mapped to the game integration ID such that the played game is resumed at the stored state of play according to either the game integration ID or the mobile ID mapped thereto on one of the mobile terminal and a second mobile terminal.

* * * * *

UNITED STATES PATENT AND TRADEMARK OFFICE
CERTIFICATE OF CORRECTION

PATENT NO. : 9,302,188 B2
APPLICATION NO. : 13/936505
DATED : April 5, 2016
INVENTOR(S) : Kim et al.

It is certified that error appears in the above-identified patent and that said Letters Patent is hereby corrected as shown below:

On the title page item [73], delete "NHN Entertainment Corportion, Seongnam-si (KR)" insert --K-INNOVATION, Seongnam-si (KR)--.

Signed and Sealed this
Twenty-eighth Day of June, 2016

Michelle K. Lee
*Director of the United States Patent and Trademark Office*